( 12 ) United States Patent
Li et al.

(10) Patent No.: US 10,630,994 B2
(45) Date of Patent: Apr. 21, 2020

(54) SPECIFIC OPERATION PREDICTION IN VIDEO COMPRESSION

(71) Applicant: Agora Lab, Inc., Santa Clara, CA (US)

(72) Inventors: Jiali Li, Shanghai (CN); Jian Lou, Santa Clara, CA (US); Zhenyong Chen, Shanghai (CN); Zhonghou Zheng, Shanghai (CN); Wei Dai, Shanghai (CN); Qianzong Chen, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 149 days.

(21) Appl. No.: 15/635,488

(22) Filed: Jun. 28, 2017

(65) Prior Publication Data

US 2019/0007687 A1   Jan. 3, 2019

(51) Int. Cl.
*H04N 19/44*      (2014.01)
*H04N 19/157*    (2014.01)
(Continued)

(52) U.S. Cl.
CPC ......... *H04N 19/157* (2014.11); *H04N 19/105* (2014.11); *H04N 19/136* (2014.11);
(Continued)

(58) Field of Classification Search
None
See application file for complete search history.

(56) References Cited

U.S. PATENT DOCUMENTS

| 6,718,074 B1 * | 4/2004 | Dutta-Choudhury ....................... G06T 3/403 345/660 |
| 8,934,026 B2 * | 1/2015 | Tian ....................... H04N 19/82 348/14.13 |

(Continued)

FOREIGN PATENT DOCUMENTS

WO    WO-2018131515 A1 *   7/2018   .............. H04N 19/54

OTHER PUBLICATIONS

Du Y, Ren H, Pan G, et al., "Tilt & touch: mobile phone for 3D interaction." Proceedings of the 13th international conference on Ubiquitous computing. ACM, 2011: 485-486.

(Continued)

*Primary Examiner* — Shadan E Haghani
(74) *Attorney, Agent, or Firm* — Young Basile Hanlon & MacFarlane, P.C.

(57) ABSTRACT

A decoding method includes: decoding from the video bitstream a prediction status parameter indicative of whether SOP is enabled; if the SOP is enabled, determining a SOP type indicative of a specific operation for predicting a current picture of the video bitstream; and determining a predicted picture by applying the specific operation to at least one of a reference picture for the current picture and the current picture, in which the specific operation includes at least one of rotation and zoom. An encoding method includes: if SOP is enabled, determining SOP data indicative of a specific operation for predicting a current picture of a video sequence; determining a predicted picture by applying the specific operation to at least one of a reference picture for the current picture and the current picture, in which the specific operation includes at least one of rotation and zoom; and encoding the SOP data.

20 Claims, 9 Drawing Sheets

(51) Int. Cl.

| | | |
|---|---|---|
| *H04N 19/463* | (2014.01) | |
| *H04N 19/547* | (2014.01) | |
| *H04N 19/61* | (2014.01) | |
| *H04N 19/70* | (2014.01) | |
| *H04N 19/82* | (2014.01) | |
| *H04N 19/105* | (2014.01) | |
| *H04N 19/46* | (2014.01) | |
| *H04N 19/51* | (2014.01) | |
| *H04N 19/136* | (2014.01) | |
| *H04N 19/176* | (2014.01) | |
| *H04N 19/162* | (2014.01) | |

(52) U.S. Cl.
CPC ......... *H04N 19/162* (2014.11); *H04N 19/176* (2014.11); *H04N 19/45* (2014.11); *H04N 19/46* (2014.11); *H04N 19/463* (2014.11); *H04N 19/51* (2014.11); *H04N 19/547* (2014.11); *H04N 19/61* (2014.11); *H04N 19/70* (2014.11); *H04N 19/82* (2014.11)

(56) References Cited

U.S. PATENT DOCUMENTS

| | | | |
|---|---|---|---|
| 2010/0215101 A1* | 8/2010 | Jeon | H04N 19/105 375/240.12 |
| 2012/0230594 A1* | 9/2012 | Boyce | H04N 19/46 382/232 |
| 2015/0208070 A1* | 7/2015 | Verzijp | H04N 19/46 375/240.02 |
| 2015/0271525 A1* | 9/2015 | Hendry | H04N 19/46 375/240.27 |
| 2017/0201751 A1* | 7/2017 | Seo | H04N 19/105 |
| 2017/0302719 A1* | 10/2017 | Chen | H04L 65/4069 |
| 2018/0205965 A1* | 7/2018 | Chen | H04N 19/52 |
| 2018/0249177 A1* | 8/2018 | Lin | H04N 7/24 |
| 2018/0278971 A1* | 9/2018 | Wang | H04N 21/435 |

OTHER PUBLICATIONS

Barthold C, Subbu K P, Dantu R., Evaluation of gyroscope-embedded mobile phones. Systems, Man, and Cybernetics (SMC), 2011 IEEE International Conference on. IEEE, 2011: 1632-1638.

"Gyroscope" (https://en.wikipedia.org/wiki/Gyroscope. Five pages.

Huang Y W, Hsieh B Y, Chien S Y, et al., "Analysis and complexity reduction of multiple reference frames motion estimation in H. 264/AVC," IEEE Transactions on Circuits and Systems for Video Technology, 2006, 16(4): 507-522 (pp. 507-522).

Gruber, Diana, "The Mathematics of the 3D Rotation Matrix" (18 pages)<http://www.fastgraph.com/makegames/3drotation/>.

"Quaternion" (5 pages) <https://en.wikipedia.org/wiki/Quaternion>.

Sjoberg R, Chen Y, Fujibayashi A, et al., Overview of HEVC high-level syntax and reference picture management, IEEE Transactions on Circuits and Systems for Video Technology, 2012, 22(12): 1858-1870.

Su Y, Sun M T., "Fast multiple reference frame motion estimation for H. 264/AVC", IEEE Transactions on Circuits and Systems for Video Technology, 2006, 16(3): 447-452.

Sullivan G J, Ohm J R, Han W J, et al., "Overview of the high efficiency video coding (HEVC) standard," IEEE Transactions on circuits and systems for video technology, 2012, 22(12): 1649-1668.

Sullivan G J, Wiegand T., "Video compression—from concepts to the H. 264/AVC standard." Proceedings of the IEEE, 2005, 93(1): 18-31.

Wiegand T, Sullivan G J, Bjontegaard G, et al. "Overview of the H. 264/AVC video coding standard." IEEE Transactions on circuits and systems for video technology, 2003, 13(7): 560-576.

* cited by examiner

SPECIFIC OPERATION PREDICTION IN VIDEO COMPRESSION

TECHNICAL FIELD

This disclosure relates to video compression, and in particular to video decoding and encoding using specific operations.

BACKGROUND

Real-time videos are widely used in many applications, such as video conferencing and video live broadcasting. To reduce sizes of transmitted videos and improve communication efficiency, the videos can be compressed, typically in accordance to a video coding standard.

Video clips can be generated from mobile devices or shared computer screens, for example. User habits or device functions often affect video contents, increasing the challenges for video compression and transmission. In one example, when taking videos with mobile phone devices, the devices are often moved around or shaken, causing rotated images. In another example, when capturing videos or sharing screens of a computer, zoom-in or zoom-out operations are often performed, causing zoomed images in the recorded or transmitted videos.

SUMMARY

Disclosed herein are implementations of methods, apparatuses, and systems for encoding and decoding a video bitstream using specific operations. In one aspect, implementations of a method for decoding a video bitstream are disclosed. The method includes decoding, from the video bitstream by a processor, a prediction status parameter indicative of whether specific-operation prediction (SOP) is enabled for the video bitstream, based on a determination that the SOP is enabled, determining, for a portion of a current picture of the video bitstream, a SOP type indicative of a specific operation for predicting the portion of the current picture, and determining a predicted picture for the current picture by applying the specific operation to at least one of a reference picture for the current picture and the current picture, wherein the specific operation comprises at least one of rotation and zoom.

In another aspect, implementations of a method for encoding a video sequence are disclosed. The method includes based on a determination that specific-operation prediction (SOP) is enabled for the video sequence, determining, by a processor, SOP data indicative of a specific operation for predicting a portion of a current picture of the video sequence, determining a predicted picture for the current picture by applying the specific operation to at least one of a reference picture for the current picture and the current picture, wherein the specific operation comprises at least one of rotation and zoom, and encoding, for the portion of the current picture, the SOP data.

In another aspect, implementations of an apparatus for decoding a video bitstream are disclosed. The apparatus includes a processor and a memory. The memory is coupled to the processor, the memory configured to store instructions which when executed by the processor become operational with the processor to determine, from the video bitstream, a prediction status parameter indicative of whether specific-operation prediction (SOP) is enabled for the video bitstream, based on a determination that the SOP is enabled, determine, for a portion of a current picture of the video bitstream, a SOP type indicative of a specific operation for predicting the portion of the current picture, and determine a predicted picture for the current picture by applying the specific operation to at least one of a reference picture for the current picture and the current picture prior to performing prediction for the current picture, wherein the specific operation comprises at least one of rotation and zoom.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Many video coding standards use a block-based hybrid video coding approach. In the block-based hybrid video coding approach, a picture (e.g., a frame, an image or a field) of a video sequence is typically partitioned into several blocks (e.g., slices, tiles, macroblocks, or blocks), and each block can be either inter-picture predicted (referred to as "inter-prediction") from other pictures, or intra-picture predicted (referred to as "intra-prediction") from the current picture. Resulted residual data (e.g., residuals, errors or differentials) and motion data (e.g., motion vectors) can be generated for compression. Other tools can also be used to further improve coding efficiency.

To improve efficiency and quality for video compression and transmission, specific-operation prediction (SOP) are provided in this disclosure. The SOP can be performed at the prediction stage (inter-prediction or intra-prediction) for a decoder or an encoder. To perform the SOP at the encoder, SOP data and parameters can be received from an external source or determined from a video sequence, and encoded in a video bitstream. To perform the SOP at the decoder, SOP data and parameters can be decoded from the video bitstream. The information used to perform the SOP can be encoded in parameter sets of the video bitstream, or headers of video data. Methods and apparatuses using the SOP will be set forth in the following description.

Figure 1:
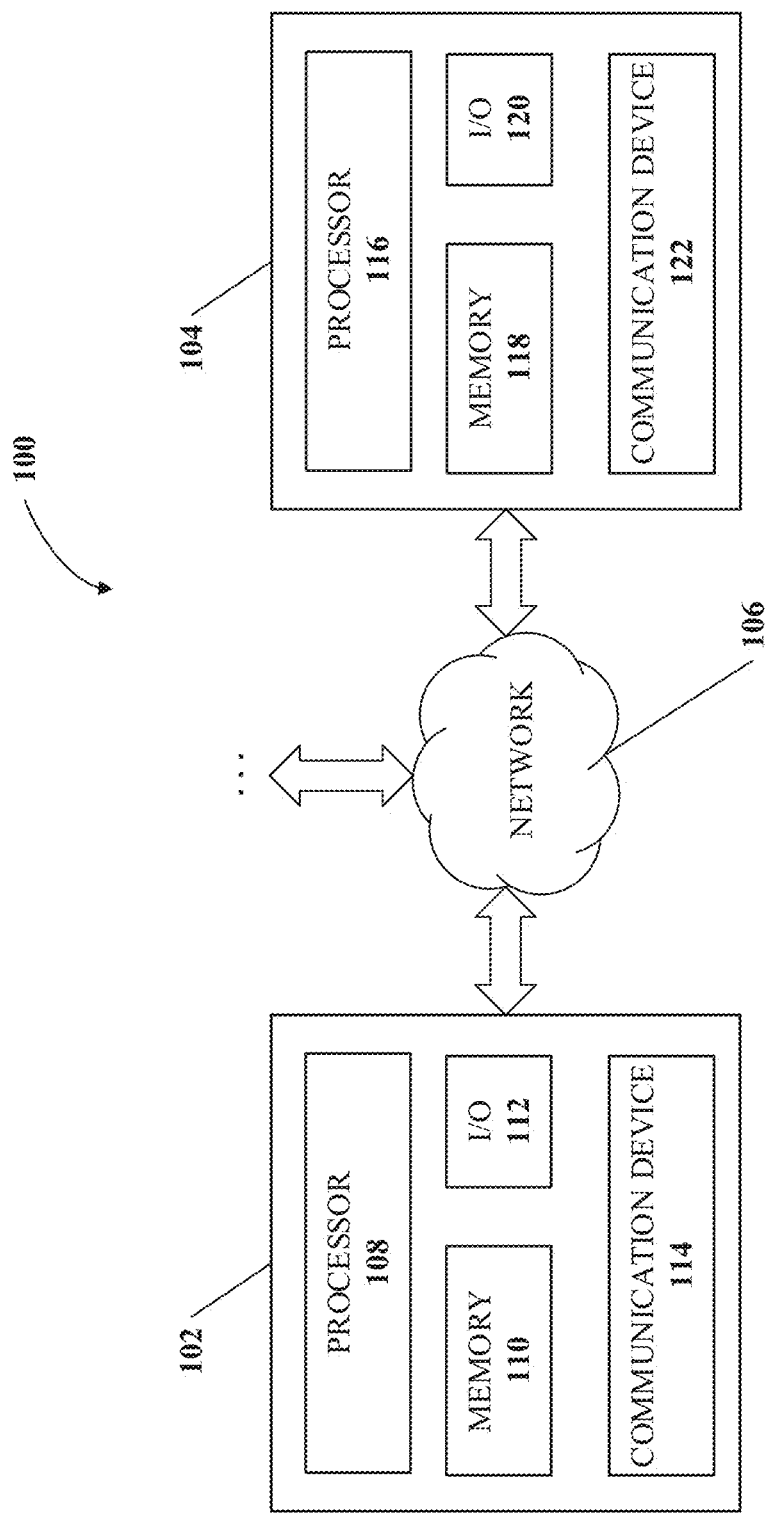
FIG. 1 is a diagram of an example system for video compression using specific-operation prediction (SOP) according to some implementations of this disclosure.

FIG. 1 is a diagram of an example system 100 for video compression using specific-operation prediction (SOP) according to some implementations of this disclosure.

The system 100 can include multiple apparatuses and networks, such as an apparatus 102, an apparatus 104, and a network 106 as shown in FIG. 1. The apparatuses can be implemented by any configuration of one or more computers, such as a microcomputer, a mainframe computer, a super computer, a general-purpose computer, a special-purpose/dedicated computer, an integrated computer, a database computer, a remote server computer, a personal computer, a laptop computer, a tablet computer, a cell phone, a personal data assistant (PDA), a wearable computing device, or a computing service provided by a computing service provider, e.g., a web host, or a cloud service provider. In some implementations, the computing device can be implemented in the form of multiple groups of computers that are at different geographic locations and can or cannot communicate with one another, such as by way of a network. While certain operations can be shared by multiple computers, in some implementations, different computers are assigned different operations. In some implementations, the system 100 can be implemented using general-purpose computers/processors with a computer program that, when executed, carries out any of the respective methods, algorithms and/or instructions described herein. In addition, or alternatively, for example, special purpose computers/processors can be utilized which can contain specialized hardware for carrying out any of the methods, algorithms, or instructions described herein.

The apparatus 102 can have an internal configuration of hardware including a processor 108 and a memory 110. The processor 108 can be any type of device or devices capable of manipulating or processing information. In some implementations, the processor 108 can include a central processor (e.g., a central processing unit or CPU). In some implementations, the processor 108 can include a graphics processor (e.g., a graphics processing unit or GPU). Although the examples herein can be practiced with a single processor as shown, advantages in speed and efficiency can be achieved using more than one processor. For example, the processor 108 can be distributed across multiple machines or devices (each machine or device having one or more of processors) that can be coupled directly or connected across a local area network or other networks. The memory 110 can be any transitory or non-transitory device or devices capable of storing codes and data that can be accessed by the processor (e.g., via a bus). The memory 110 herein can be a random access memory device (RAM), a read-only memory device (ROM), an optical/magnetic disc, a hard drive, a solid state drive, a flash drive, a security digital (SD) card, a memory stick, a compact flash (CF) card, or any combination of any suitable type of storage device. In some implementations, the memory 110 can be distributed across multiple machines or devices, such as a network-based memory or cloud-based memory. The memory 110 can include data, an operating system, and an application (not shown). The data can be any data for processing (e.g., video pictures or bitstreams). The application can include programs that permit the processor 108 to implement instructions to generate control signals for performing functions of the methods in the following description.

In some implementations, in addition to the processor 108 and the memory 110, the apparatus 102 can also include a secondary/additional/external storage device (not shown). When present, the secondary storage device can provide additional memory when high processing needs exist. The secondary storage device can be a storage device in the form of any suitable non-transitory computer readable medium, such as a memory card, a hard disc drive, a solid state drive, a flash drive or an optical drive. Further, the secondary storage device can be a component of the apparatus 102 or can be a shared device that is accessed via a network. In some implementations, the application in the memory 110 can be stored in whole or in part in the secondary storage device and loaded into the memory 110 as needed for processing.

In addition to the processor 108 and the memory 110, the apparatus 102 can include input/output (I/O) devices. For example, the apparatus 102 can include an I/O device 112. The I/O device 112 can be implemented in various ways, for example, it can be a display that can be coupled to the apparatus 102 and configured to display a rendering of graphic data. The I/O device 112 can be any device transmitting a visual, acoustic, or tactile signal to a user, such as a display, a touch sensitive device (e.g., a touch screen), a speaker, an earphone, a light-emitting diode (LED) indicator, or a vibration motor. The I/O device 112 can also be any type of input device either requiring or not requiring user intervention, such as, a keyboard, a numerical keypad, a mouse, a trackball, a microphone, a touch sensitive device (e.g., a touch screen), a sensor, or a gesture-sensitive input device. If the I/O device 112 is a display, for example, it can be a liquid crystal display (LCD), a cathode-ray tube (CRT), or any other output device capable of providing visible output to an individual. In some cases, an output device can also function as an input device—a touch screen display configured to receive touch-based input, for example.

The I/O device 112 can alternatively or additionally be formed of a communication device for transmitting signals and/or data. For example, the I/O device 112 can include a wired mean for transmitting signals or data from the apparatus 102 to another device. For another example, the I/O device 112 can include a wireless transmitter or receiver using a protocol compatible to transmit signals from the apparatus 102 to another device or to receive signals from another device to the apparatus 102.

In addition to the processor 108 and the memory 110, the apparatus 102 can optionally include a communication device 114 to communicate with another device. Optionally, the communication can be via a network 106. The network 106 can be one or more communications networks of any suitable type in any combination, including, but not limited to, networks using Bluetooth communications, infrared communications, near field connections (NFC), wireless networks, wired networks, local area networks (LAN), wide area networks (WAN), virtual private network (VPN), cellular data networks and the Internet. The communication device 114 can be implemented in various ways, such as a transponder/transceiver device, a modem, a router, a gateway, a circuit, a chip, a wired network adapter, a wireless network adapter, a Bluetooth adapter, an infrared adapter, an NFC adapter, a cellular network chip, or any suitable type of device in any combination that is coupled to the apparatus 102 to provide functions of communication with the network 106.

Similar to the apparatus 102, the apparatus 104 includes a processor 116, a memory 118, an I/O device 120, and a communication device 122. The implementations of elements 116-122 of the apparatus 104 can be similar to those of the apparatus 102. For ease of explanation, the apparatus 102 are used as an example apparatus for description, but the functions, methods, and processes of this disclosure is not limited to any specific implementation of apparatuses. The apparatuses 102 and 104 can perform different functions for video compression. For example, the apparatus 102 can be used as a video decoder, and the apparatus 104 can be used as a video encoder. The apparatus 102 can communicate with the apparatus 104 via the network 106. The apparatuses 102 and 104 can also communicate with other apparatuses connected with the network 106.

The apparatuses 102 and 104 (and algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In this disclosure, the term "processor" should be understood as encompassing any the foregoing, either singly or in combination. The terms "signal," "data," and "information" are used interchangeably. Further, portions of the apparatuses 102 and 104 do not necessarily have to be implemented in the same manner.

Figure 2:
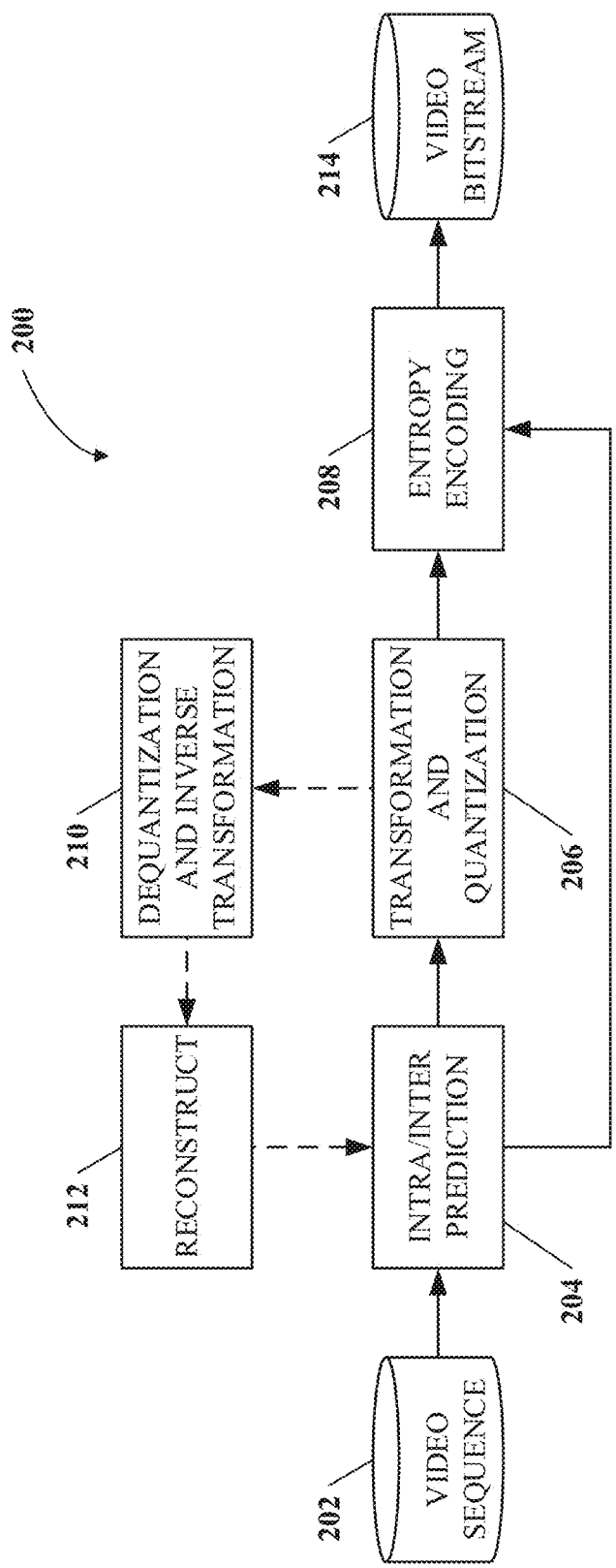
FIG. 2 is a diagram of an example encoding process according to some implementations of this disclosure.

FIG. 2 is a diagram of an example SOP encoding process 200 according to some implementations of this disclosure. The process 200 can be implemented as software and/or hardware modules in the system 100 in FIG. 1. For example, the process 200 can be implemented as software or hardware modules included in the system 100 by an encoder (e.g., the apparatus 104). The encoder can be implemented by program codes stored in memory (e.g., the memory 118). The program codes can include computer-readable instructions that, when executed by a processor (e.g., the processor 116), cause the encoder to encode video sequence data in the manner described in FIG. 2. The encoder can also be implemented as specialized hardware included in an apparatus (e.g., the apparatus 104). For example, the encoder can be a hardware encoder. The process 200 includes data and operations 202-212 to produce an output video bitstream from a video sequence, which are set forth as follows.

The process 200 includes a forward path as shown by the solid connection lines in FIG. 2. In the forward path, an encoded or compressed video bitstream can be produced using a video sequence 202 as input. In the process 200, the forward path includes the following operations or stages to perform various functions: an intra/inter prediction operation 204, a transformation and quantization operation 206, and an entropy encoding operation 208. The process 200 can also include a reconstruction path as shown by the dotted connection lines in FIG. 2. In the reconstruction path, a picture or frame can be reconstructed for encoding a future picture of the video sequence 202. In the process 200, the reconstruction path includes the following operations or stages to perform various functions: a dequantization and inverse transformation operation 210 and a reconstruction operation 212. Other structural variations of the process 200 can be used to encode the video sequence 202.

The video sequence 202 can be received by the encoder. The term "receive" used herein can refer to receiving, inputting, acquiring, retrieving, obtaining, reading, accessing, or any action in any manner for inputting information or data. The video sequence 202 includes a series of consecutive video pictures (e.g., a current picture) for encoding.

At operation 204, inter-prediction or intra-prediction can be performed for the current picture. Syntax data (e.g. parameters) indicating a prediction mode can also be generated. When SOP is enabled, specific operation data can also be received by the encoder to be used at the operation 204. The specific operation data can be determined from the video sequence or from other sources (e.g., sensors associated with the apparatus 104). In the process 200, as an example, the specific operation can be performed at operation 204 for reference data (e.g., reference pictures, reference slices, reference tiles, reference macroblocks, or reference blocks) of the current picture used for prediction. The specific operation can also be performed for the current picture. Details about the SOP data and operation will be described below in FIGS. 4-9.

For example, for inter-prediction, motion estimation can be performed using the current picture and the reference data (e.g., one or more reference pictures). The SOP can be applied to the reference data or the current picture prior to the motion estimation. The motion estimation in the inter-prediction mode can generate motion data (e.g., motion vectors). The motion vectors can describe transformation (e.g., offsets) from blocks of the reference pictures to blocks of the current picture. Using the generated motion data and the reference data, motion compensation can be performed to generate motion-compensated data (or "prediction data"). The prediction data can include a picture or a portion of the picture (e.g., a slice, a tile, a macroblock, or a block). For example, a motion-compensated picture (a "predicted picture") of the current picture can be determined by offsetting the blocks of the reference pictures in accordance with the motion vectors. The prediction data can be subtracted from the current picture to generate residual data (e.g., residual pictures, residual slices, residual tiles, residual macroblocks, or residual blocks). The reference data used in the inter-prediction can be previously determined and stored in a buffer (e.g., in the memory 110 in FIG. 1). The residual data and the motion data can be entropy encoded in later operations, in which the residual data can be transformed and quantized before being entropy encoded.

For another example, if the intra-prediction is performed for the current picture, predicted blocks can be generated for a current block of the current picture using previously coded blocks from the current picture. The predicted block can be subtracted from the current block to determine residual data (e.g., residual blocks). The residual blocks can be transformed, quantized, and entropy encoded in later operations.

At operation 206, the residual data is transformed and quantized. The transformation can generate transform coefficients that can be encoded in a video bitstream for output. For example, if the transformation is block-based, it can use Karhunen-Loève Transform (KLT), Discrete Cosine Transform ("DCT"), Discrete Sine Transform ("DST"), or Singular Value Decomposition Transform ("SVD"). In one example, the DCT can be used to transform a block into a frequency domain. In another example, the DST can be used to transform a block into the frequency domain.

The quantization can convert the transform coefficients into discrete quantum values (referred to as "quantized transform coefficients"). The quantization can reduce the number of discrete states represented by the transform coefficients, thus reducing data sizes. The quantization can cause image quality loss during encoding and decoding (referred to as being "lossy").

At operation 208, the transformed and quantized residual data, the motion data, the specific operation data can be entropy encoded to the video bitstream 214. Entropy coding can be performed by any lossless coding techniques such as, for example, fix-length or variable-length coding (e.g., Huffman coding or arithmetic coding). In some implementations, optionally, a loop filter (not shown) can be additionally applied before the operation 208. The loop filter can reduce distortion (e.g., blocking artifacts) introduced by the video compression. Other information used to decode the resulted video bitstream can also be entropy encoded, such as the syntax data indicative of the used prediction mode (information indicating that the current block is intra-predicted or inter-predicted), transformation type, quantization level, and loop filter parameters (e.g., filter strength) of the optional loop filter (not shown in FIG. 2).

At operation 210, the transformed and quantized residual data and the motion data (e.g., the motion vectors) can be dequantized (inverse quantization) and inverse transformed for reconstruction at operation 212. The operations 210 and 212 can ensure that both the encoder (e.g., the apparatus 104 in FIG. 1) and a decoder (e.g., the apparatus 102 in FIG. 1) can use the same reference data for prediction.

At the operation 212, a reconstructed picture of the current picture can be determined. For example, a predicted picture can be determined using the reference data of the current picture and the dequantized and inverse transformed motion data determined at the operation 210. The reconstructed picture can be determined by summing the predicted picture and the dequantized and inverse transformed residual data determined at the operation 210. The reconstructed picture can be used as future reference data for encoding a future picture successive to the current picture. The reconstructed picture can be stored in a buffer (e.g., in the memory 118 in FIG. 1) to be used as the future reference data. In some implementations, optionally, a loop filter (not shown) can be additionally applied after the operation 212. In other implementations, the reconstructed picture can be used without using the loop filter. The reconstruction can be similar to a reconstruction stage in a decoding process (e.g., operation 310 in FIG. 3).

The reference data of the current picture can be reconstructed at the operation 212 and used for processing a future picture successive to the current picture. For example, the SOP can be performed for the reconstructed reference data of the current picture using received specific operation data associated with the future picture, prior to performing the inter-prediction for the future picture at the operation 204.

After the operation 208, the entropy encoded video bitstream 214 is outputted. For example, the video bitstream 214 can be stored as a computerized file. For another example, the video bitstream 214 can be transmitted over a network (e.g., the network 106 in FIG. 1) to other devices (e.g., a decoder).

Other variations of the process 200 can be used to encode the video sequence 202. The data and operations in the process 200 can be processed and performed in different orders, combined into fewer stages, and/or divided into more stages without changing its purpose. For example, a non-transform based encoder can quantize the residual data without transformation. For another example, an encoder can have transformation and quantization stage performed in different stages.

Figure 3:
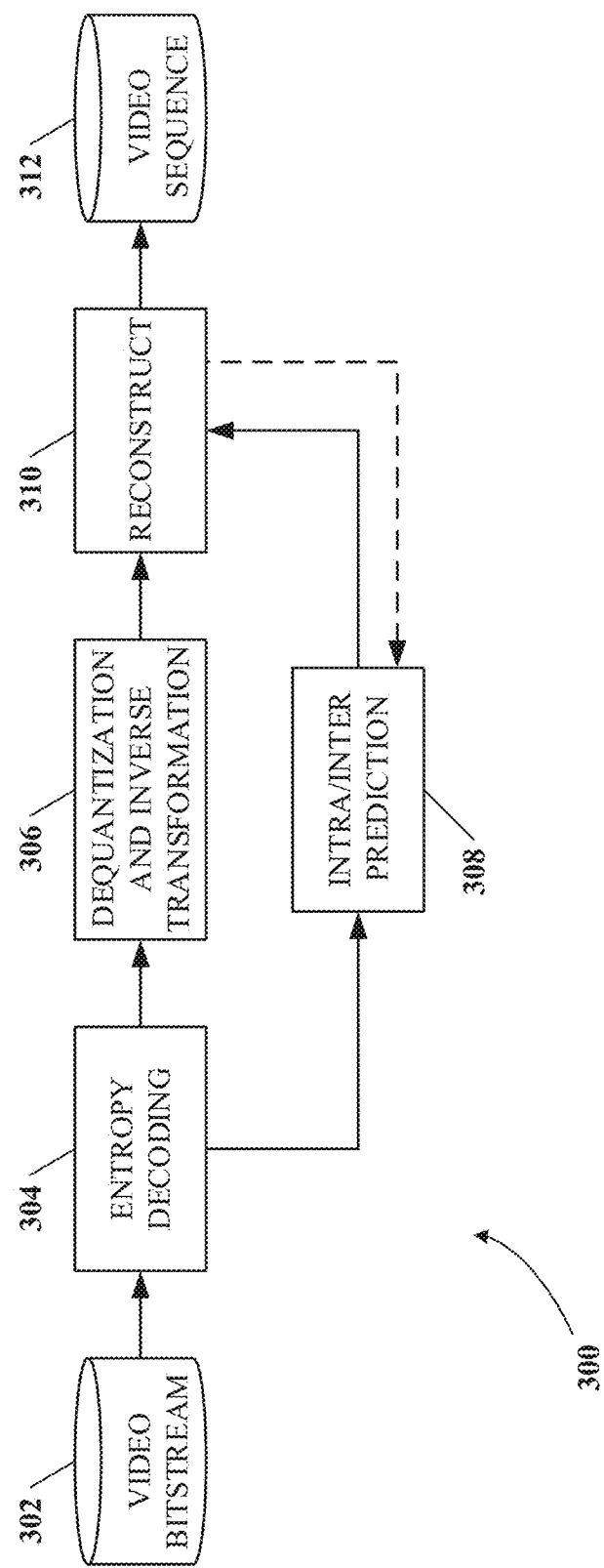
FIG. 3 is a diagram of an example decoding process according to some implementations of this disclosure.

FIG. 3 is a diagram of an example SOP decoding process 300 according to some implementations of this disclosure. The process 300 can be implemented as software and/or hardware modules in the system 100 in FIG. 1. For example, the process 300 can be implemented as software or hardware modules included in the system 100 by a decoder (e.g., the apparatus 102). The decoder can be implemented by program codes stored in memory (e.g., the memory 110). The program codes can include computer-readable instructions that, when executed by a processor (e.g., the processor 108), cause the decoder to decode a video bitstream 302 in the manner described in FIG. 3. The decoder can also be implemented as specialized hardware included in an apparatus (e.g., the apparatus 102). For example, the decoder can be a hardware decoder. The process 300 includes data and operations 302-312 to produce an output video sequence from a compressed video bitstream, which are set forth as follows.

The process 300, similar to the reconstruction path of the process 200 discussed above, includes the following operations or stages to perform various functions: an entropy decoding operation 304, a dequantization and inverse transformation operation 306, an intra/inter prediction operation, and a reconstruction operation. Other structural variations of the process 300 can be used to decode the video bitstream 302.

The video bitstream 302 can be received by the decoder and entropy decoded at operation 304. For example, encoded data representing a current picture of the video bitstream 302 ("current picture data") can be received.

At the operation 304, the current picture data can be entropy decoded to a state before being entropy encoded. The entropy decoded current picture data can include motion data (e.g., motion vectors for motion compensation) and transformed and quantized residual data. When the video bitstream 302 is encoded using SOP, specific operation data can also be entropy decoded from the current picture data. Information indicating the current picture is intra-predicted or inter-predicted can also be entropy decoded from the current picture data for the decoder to determine which prediction mode to perform. The transformed and quantized residual data can then be dequantized and inverse transformed at the operation 306 to determine residual data. In some implementations, the operation 306 can be implemented as one stage or two separate stages.

The specific operation data can be used to indicate the decoder whether to perform the SOP. If the specific operation data indicates the SOP is to be performed (e.g., indicated by a prediction status parameter), the specific operation data can further include other data for performing the SOP that is also entropy decoded from the video bitstream 302. The SOP can be performed for inter-prediction or intra-prediction in later operations of the process 300. The specific operation data and details of performing the SOP for decoding will be detailed below in FIGS. 4-9.

The residual data can include data for inter-picture prediction or intra-picture prediction. The intra-prediction can use spatial dependencies of the same picture (e.g., the current picture) for video compression. For example, the intra-prediction can predict the contents (e.g., pixel values) of a block of the current picture (referred to as a "current block") by determining from previously processed reference blocks (e.g., spatially nearby blocks) of the current picture whether contents of the reference blocks are similar to the current block. If the original video is processed and compressed in a raster scan order, blocks prior to the current block (e.g., in the raster scan order) can be used as the reference blocks for intra-prediction, because they can be reconstructed prior to the current block and will be available when reconstructing the current block. For example, if the prediction mode is determined to be the intra-prediction, the residual data can include the reference blocks and the residual blocks.

The inter-prediction can use temporal dependencies between pictures for video compression. The inter-prediction can perform motion estimation using a current picture and one or more reference pictures (e.g., temporally nearby pictures of the current picture), and then perform motion compensation for the current picture. For example, the motion compensation can move (e.g., translate) portions (e.g., slices, tiles, macroblocks, or blocks) of the reference pictures in accordance with the motion vectors to construct the motion-compensated picture. For example, if the prediction mode is determined to be the inter-prediction, the residual data can include the reference pictures and the residual pictures.

At operation 308, the predicted picture of the current picture can be determined in an inter-prediction mode or an intra-prediction mode. The decoded current picture data can include syntax data (e.g. parameters) to indicate the decoder which prediction mode to use.

In an example, for inter-prediction, motion compensation can be performed and a motion-compensated picture (a "predicted picture") can be determined using the motion data (e.g., the motion vectors) and reference data (e.g., reference pictures, reference slices, reference tiles, reference macroblocks, or reference blocks) of the current picture. In the process 300, as an example, the SOP can be performed at the operation 308 for the reference data (e.g., reference pictures) before the motion compensation.

In another example, for intra-prediction, the predicted picture can be determined using reference blocks (e.g., included in the residual data), then added with the residual data (e.g., the residual pictures). In an implementation, the SOP can be applied to the reference blocks.

At operation 310, a reconstructed picture of the current picture can be determined. The operation 310 can be similar to the operation 212 in the process 200. For example, the reconstructed picture can be determined by adding the predicted picture determined at the operation 308 to the residual data (e.g., the residual pictures) determined at the operation 306. The reconstructed picture can be outputted in the video sequence 312. In some implementations, the reconstructed picture can be filtered using a loop filter after the operation 310. In another example, the reconstructed picture can be outputted without using the loop filter. The video sequence 312 can be outputted for displaying on a screen. The video sequence 312 can also be outputted as a computerized file stored in a storage medium.

As shown by the doted connection line in FIG. 3, after the operation 310, the reconstructed picture can be used as future reference data for processing a future picture successive to the current picture at the operation 308. In addition to be outputted in the video sequence 312, the reconstructed picture can also be stored in a buffer (e.g., in the memory 110 in FIG. 1) to be used as the future reference data. In an example, at the operation 308, the SOP can be performed for the future reference data of the future picture. In some implementations, the future reference data can be filtered using a loop filter (not shown) before being used at the operation 308.

Other variations of the process 300 can be used to decode the video bitstream 302. The data and operations in the process 300 can be processed and performed in different orders, combined into fewer stages, and/or divided into more stages without changing its purpose.

Figure 4A:
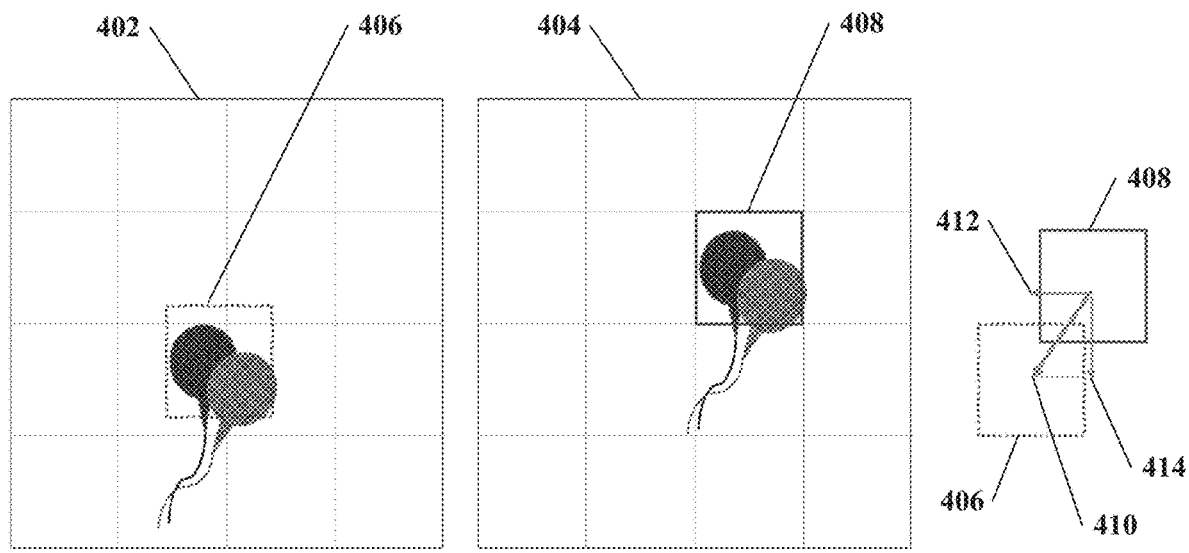
FIG. 4A is a diagram of an inter-prediction example.

FIG. 4A is a diagram of an inter-prediction example. In FIG. 4A, a picture 402 and a picture 404 are two consecutive pictures in a video sequence. Two flying objects are shown in the pictures 402 and 404. Each of the pictures 402 and 404 is divided into blocks as shown for block-based encoding. When encoding in the inter-prediction mode, the pictures in the video sequence can be encoded in a temporal order of the pictures, such as in a forward prediction. For example, when encoding the picture 404, the picture 402 can have been encoded and reconstructed to be used as a reference frame for the picture 404. In the motion estimation for a block 408 of the picture 404, the closest match to the block 408 can be searched and determined from reference pictures of the picture 404 (e.g., the picture 402). In FIG. 4A, the closest match to the block 408 is determined as a block 406 in the picture 402. The motion of the block 408 between the pictures 402 and 404 can be denoted as a motion vector 410. The motion vector 410 can be decomposed into two components, such as an X component 412 and a Y component 414. Using the block 406 and the motion vector 410, a predicted block (not shown) can be determined for the block 408, and a residual block (not shown) can be further determined by subtracting the predicted block from the block 408. The residual block and the motion vector can be encoded for transmission with a data size less than the original video sequence.

The example shown in FIG. 4A is a "forward" inter-prediction. A forward inter-predicted picture can be referred to as a "P-picture." In addition to forward inter-prediction, backward inter-prediction can also be used, which uses a reference picture temporally posterior to a current picture for encoding and decoding. Further, bi-directional inter-prediction can also be used, which uses a first reference picture temporally prior to a current picture and a second reference picture temporally posterior to the current picture for encoding and decoding. A bi-directionally inter-predicted picture can be referred to as a "B-picture."

Figure 4B:
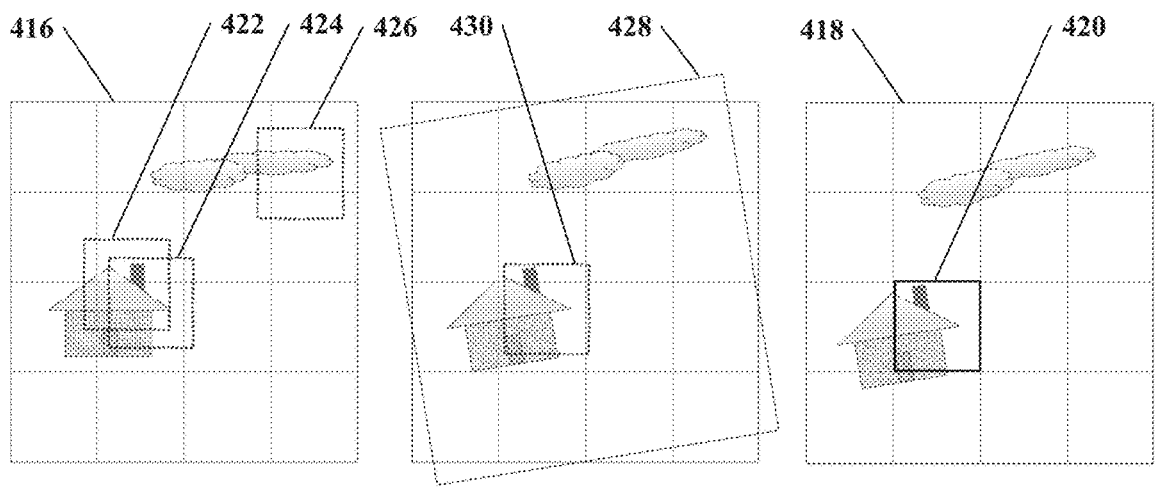
FIG. 4B is a diagram of an inter-prediction example with a rotated picture.

FIG. 4B is a diagram of an inter-prediction example with a rotated picture. In FIG. 4B, a picture 416 and a picture 418 are two consecutive pictures in a video sequence. The picture 416 is used as a reference picture for the picture 418. For a block 420 in the picture 418, it can be difficult to determine the closest matching block from the picture 416 (e.g., from blocks 422-426 of the picture 416) using motion translation. In this example, a solution is to rotate the picture 416 by a certain angle, represented by a rotated picture 428. A block 430 can be determined as the closest matching block of the block 420. The rotation can be used, for example, on the entire picture or portions of the picture.

As illustrated in the example of FIG. 4A, various operations (e.g., rotation and zoom) can be performed on devices taking images and videos, or screens of the devices. To improve prediction efficiency and quality, information of those operations can be utilized. For example, if a video capturing device (e.g., a smart phone, a tablet, or a camera) includes motion sensors (e.g., a gyroscope, an accelerometer, or an inertial measurement unit), the sensed data associated with spatial movements of the video capturing device can be collected for performing a specific operation (e.g., a rotation operation) to the captured video. For another example, if a video recording device includes tactile sensors (e.g., a touch screen) in its screen, the sensed data associated with zooming operations (e.g., pinching on the screen) can be collected for performing a specific operation (e.g., a zoom operation) to the recorded video. For another example, if rotation between pictures of a video sequence can be detected using an image processing technique, the detected rotation information can be used to perform a specific operation to correct the rotation. In addition to the above examples, other data (referred to as "specific operation prediction data" or "SOP data") can also be collected for performing one or more other types of specific operations (e.g., fade-in, fade-out, zoom plus rotation, or any combination thereof). Other types of information of operations applied to the video capturing device or its screen can also be used for performing the specific operations.

The SOP can be standardized into a coding standard to be used by video decoders and encoders. For example, specific operations can be applied to reference pictures or reference blocks before performing inter-prediction or intra-prediction, respectively. For another example, inter-prediction or intra-prediction can be performed using reference pictures or reference blocks, respectively, before specific operations being applied to the predicted picture. The SOP can be applied to different coding units (e.g., a picture, a slice, a tile, a macroblock, or a block). In an implementation, the SOP can be applied to an entire picture before performing block-based inter- or intra-prediction.

In an implementation, to achieve smaller data size, SOP data associated with specific operations and normally encoded reference pictures can be included in the video bitstream. The "normally encoded" reference pictures refer to the reference pictures encoded in the inter- or intra-prediction mode without applying the SOP. The decoder can receive the normally encoded reference pictures and the SOP data, then performs the specific operations on the normally encoded reference pictures for decoding a current picture.

During encoding or decoding, to balance between computing cost and memory overhead, there can be multiple implementations to apply the SOP. In an implementation, the SOP can be applied ad hoc to a reference picture. For example, when the reference picture is used for multiple times by different pictures, the SOP can be applied for the multiple times to the same reference picture. In this implementation, the computing cost may be high but the memory overhead can be lowered. In another implementation, the SOP can be applied to a reference picture for once, and the reference picture with the SOP applied can be stored for later use. For example, when the reference picture is used for multiple times by different pictures, the stored reference picture with the SOP applied can be retrieved. In this implementation, the memory overhead may be high but the computing cost can be lowered.

In video compression, some coding structures are used by various coding standards. For example, to adapt to various applications, a video coding layer (VCL) and a network abstraction layer (NAL) have been designed. The VCL is specified to represent contents of video data, and the NAL is specified to format the video data and provide header information to packetize the video data for network transmission. The coded video data (e.g., a video bitstream) can be transmitted in packetized NAL units (NALU). The NAL units have different types, which can be generally organized into 2 classes: VCL NALUs, and non-VCL NALUs. The VCL NALUs contain data that represents values of samples in the video pictures, and the non-VCL NALUs contain other related information, such as parameter sets.

In some coding standards, the first packet of a picture typically carries segment data associated with the first picture, such as, for example, a picture header, a group of pictures (GOP) header, or a sequence header. Loss of the picture header or the sequence header can result in incorrect reconstruction for the picture or the sequence. The parameter sets are introduced in H.264/AVC to solve that problem. A parameter set can contain information expected to less-likely change for decoding a number of VCL NALUs. There are two types of parameter sets introduced in some coding standards: sequence parameter sets (SPS) and picture parameter sets (PPS). SPS is applied to a video sequence for decoding, and PPS is applied to one or more individual pictures of a video sequence for decoding. More parameter sets can be used. For example, video parameter sets (VPS) is introduced in some coding standards to convey information applicable to multiple video layers and sub-layers. The VPS can be used to describe overall characteristics of the coded sequences and dependencies between the video sub-layers.

Figure 5:
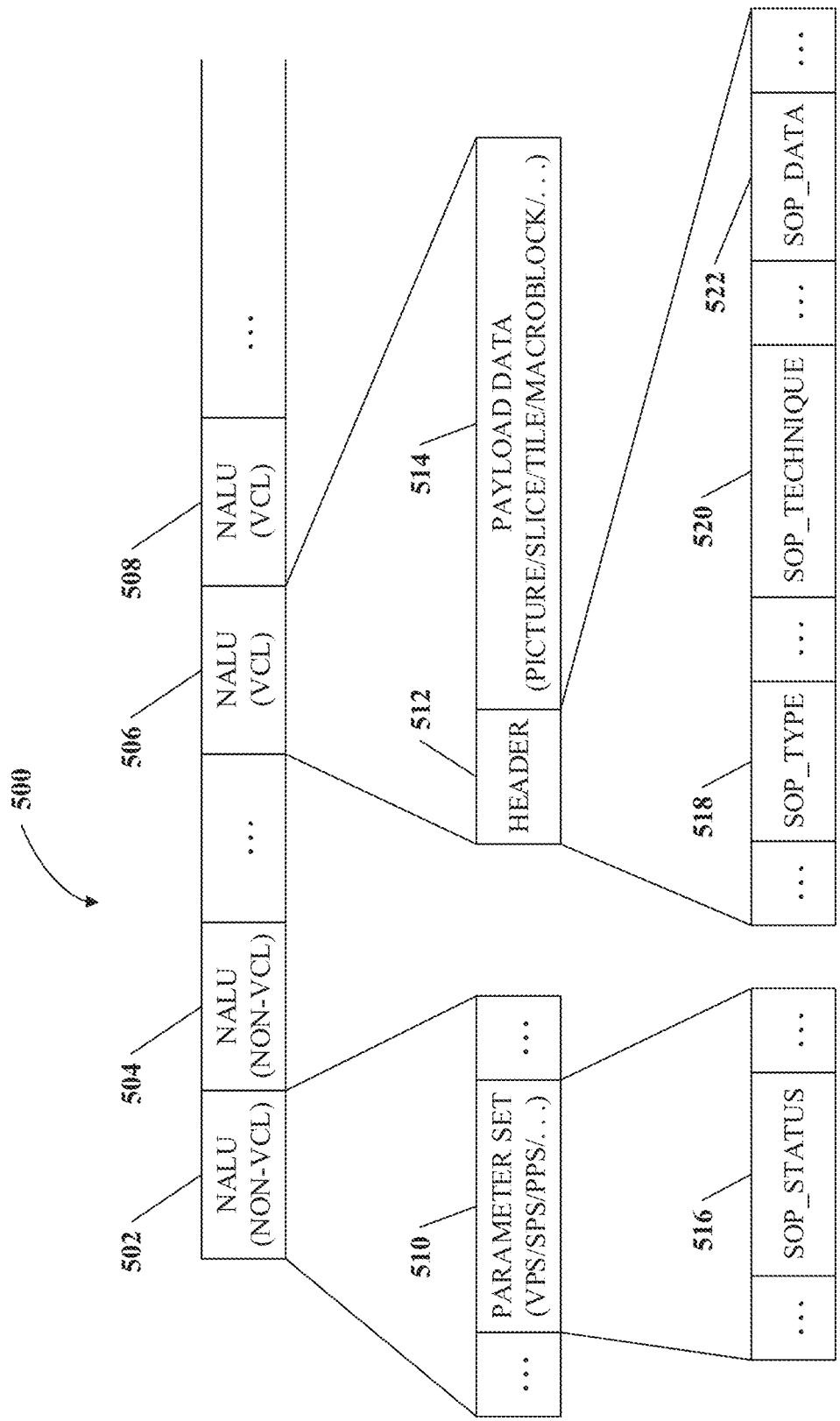
FIG. 5 is a diagram of an example format of a compressed bitstream using SOP according to some implementations of this disclosure.

The details of the SOP for video decoding and encoding will be described in FIGS. 5-9. FIG. 5 is a diagram of an example format of a compressed video bitstream 500 received by a decoder according to implementations of this disclosure. The bitstream 500 has syntaxes and structures compatible for the decoder to apply the SOP.

In FIG. 5, the video bitstream 500 includes multiple non-VCL NALUs (including non-VCL NALUs 502 and 504) and multiple VCL NALUs (including VCL NALUs 506 and 508). The non-VCL NALU 502 can include a parameter set 510. The parameter set 510 can be a VPS, a SPS, a PPS, or other types of parameter sets. Other non-VCL NALUs can also be parameter sets, such as the non-VCL NALU 504. The VCL NALU 506 can include a header 512 and payload data 514. The header 512 can include information related to decoding the payload data 514. The payload data 514 can include encoded (e.g., entropy encoded) data for a picture, a slice, a tile, a macroblock, or any portion of a picture of a video sequence. Correspondingly, the header 512 can be a picture header, a slice header, a tile header, a macroblock header, or a header of any portion of a picture.

As shown in FIG. 5, the parameter set 510 includes a prediction status parameter SOP_status 516 indicative of whether SOP is enabled for decoding the video bitstream 500 received by a decoder (e.g., the apparatus 102 in FIG. 1).

Although FIG. 5 shows the SOP_status 516 is received from a non-VCL NALU (the parameter set 510), it can be received from any NALU of the video bitstream 500, such as parameter sets (e.g., VPS, SPS, or PPS) included in one or more non-VCL NALUs, or headers included in one or more VCL NALUs. For example, the SOP_status 516 can be received from the header 512 included in the VCL NALU 506 (not shown in FIG. 5).

The SOP_status 516 can have different values indicative of different SOP statuses. In some implementations, the SOP_status 516 can be assigned with a default value indicative of a default SOP status. The SOP_status 516 can be any combination of any value. The value can be any data format, including but not limited to an integer, a real number, a character, a string, a symbol, a data structure (e.g., an array or a vector), or any combination thereof. If the SOP_status 516 includes a numerical value, the numerical value can have any radix, such as 2, 8, 10, 12, 16, 20, 60, or any number with any precision.

For example, the SOP_status 516 can be a value of 0, 1, or 2, with 0 as the default value. In this example, SOP_status=0 can be indicative of not enabling SOP for decoding, SOP_status=1 can be indicative of enabling SOP only for decoding P-pictures, and SOP_status=2 can be indicative of enabling SOP for decoding P-pictures and B-pictures.

For another example, the SOP_status 516 can be a value of 0 or 1, with 0 as the default value. In this example, SOP_status=0 can be indicative of not enabling SOP for decoding, and SOP_status=1 can be indicative of enabling SOP.

After the SOP_status 516 is received from the video bitstream 500, the decoder can determine whether the SOP is enabled for decoding current video data received from the video bitstream 500. The "current video data" refers to encoded data in the video bitstream 500 associated with a current coding unit (e.g., a picture, a slice, a tile, a macroblock, a block, or any other form of coding units). If the SOP is enabled, the decoder can receive a parameter SOP_type 518 indicative of a type of a specific operation to be performed for decoding the current video data. If the SOP is determined as not enabled, the decoder will not receive the SOP_type 518 and can decode the video bitstream 500 without performing any specific operation.

Although FIG. 5 shows the SOP_type 518 is received from a header of a VCL NALU (the header 512 of the VCL NALU 506), the SOP_type 518 can be received from any NALU of the video bitstream 500, such as parameter sets (e.g., VPS, SPS, or PPS) included in one or more non-VCL NALUs, or headers included in one or more VCL NALUs. For example, the SOP_type 518 can be received from the parameter set 510 included in the non-VCL NALU 502 (not shown in FIG. 5).

The SOP_type 518 can have different values indicative of different types of specific operations. In some implementations, the SOP_type 518 can be assigned with a default value indicative of a default type. The SOP_type 518 can be any combination of any value. The value can be any data format, including but not limited to an integer, a real number, a character, a string, a symbol, a data structure (e.g., an array or a vector), or any combination thereof. If the SOP_type 518 includes a numerical value, the numerical value can have any radix, such as 2, 8, 10, 12, 16, 20, 60, or any number with any precision. The values of the SOP_type 518 can be extended. In addition, a length (e.g., the number of bits) of the SOP_type 518 can be variable as well. For example, the length of the SOP_type 518 can be different for different NALUs in the same video bitstream 500.

For example, the SOP_type 518 can be a value of 0, 1, 2, or 3, with 0 as the default value. In this example, SOP_type=0 can be indicative of no specific operation will be performed for decoding the current video data (referred to as a "null type"), SOP_type=1 can be indicative of performing a rotation type of specific operation for decoding the current video data, SOP_type=2 can be indicative of performing a zoom type of specific operation for decoding the current video data, and SOP_type=3 can be indicative of performing both the rotation type and the zoom type of specific operations for decoding the current video data.

After the SOP_type 518 is received from the video bitstream 500, the decoder can determine whether the type of the specific operation is the null type. In some implementations, if multiple SOP_type's are received from NALUs of the video bitstream 500 and each of them is indicative of the null type, it is equivalent to that the SOP is disabled for decoding the video bitstream 500.

If the decoder determines that the type of the specific operation is not the null type, the decoder determines a non-null type of a specific operation to perform in accordance with the value of the SOP_type 518. For example, if the SOP_type 518 is indicative of a rotation type of a specific operation (referred to as a "rotation operation"), the decoder will perform the rotation operation (e.g., as shown in FIG. 4B) for the current video data. For another example, if the SOP_type 518 is indicative of a zoom type of a specific operation (referred to as a "zoom operation"), the decoder will perform the zoom operation for the current video data.

If the SOP_type 518 is indicative of a non-null type of a specific operation, the decoder can receive a parameter SOP_technique 520 indicative of which SOP technique will be used to perform the specific operation for the current video data. For example, the SOP_technique 520 can include a parameter indicative of a rotation technique ("rotation_technique") if the SOP_type 518 is indicative of the rotation operation. For another example, the SOP_technique 520 can include a parameter indicative of a zoom technique ("zoom_technique") if the SOP_type 518 is indicative of the zoom operation. If the SOP_type 518 is indicative of a null operation, the decoder will not receive the SOP_technique 520 and no specific operation will be performed.

Although FIG. 5 shows the SOP_technique 520 is received from a header of a VCL NALU (the header 512 of the VCL NALU 506), the SOP_technique 520 can be received from any NALU of the bitstream, such as parameter sets (e.g., VPS, SPS, or PPS) included in one or more non-VCL NALUs, or headers included in one or more VCL NALUs. For example, the SOP_technique 520 can be received from the parameter set 510 included in the non-VCL NALU 502 (not shown in FIG. 5).

The SOP_technique 520 can have different values indicative of different methods to perform the specific operation. In some implementations, the SOP_technique 520 can be assigned with a default value indicative of a default method. The SOP_technique 520 can be any combination of any value. The value can be any data format, including but not limited to an integer, a real number, a character, a string, a symbol, a data structure (e.g., an array or a vector), or any combination thereof. If the SOP_technique 520 includes a numerical value, the numerical value can have any radix, such as 2, 8, 10, 12, 16, 20, 60, or any number with any precision. The values of the SOP_technique 520 can be extended. In addition, a length (e.g., the number of bits) of the SOP_technique 520 can be variable as well. For example, the length of the SOP_technique 520 can be different for different NALUs in the same video bitstream 500.

After the SOP_technique 520 corresponding to a specific operation technique is received from the video bitstream 500, depending on the value of the SOP_technique 520, the decoder can perform the specific operation using received SOP_data 522. The SOP_data 522 can include aspects or characteristics of a specific operation used by the specific operation technique. For example, if the SOP_technique 520 is a rotation technique, the SOP_data 522 can include rotation data. For another example, if the SOP_technique 520 is a zoom technique, the SOP_data 522 can include zoom data.

Although FIG. 5 shows the SOP_data 522 is received from a header of a VCL NALU (the header 512 of the VCL NALU 506), the SOP_data 522 can be received from any NALU of the bitstream, such as parameter sets (e.g., VPS, SPS, or PPS) included in one or more non-VCL NALUs, or headers included in one or more VCL NALUs. For example, the SOP_data 522 can be received from the parameter set 510 included in the non-VCL NALU 502 (not shown in FIG. 5).

The SOP_data 522 (e.g., the rotation data or the zoom data) can have different values associated with the specific operation. In some implementations, the SOP_data 522 can be assigned with a default value indicative associated with a default SOP_technique 520. The SOP_data 522 can be any combination of any value. The value can be any data format, including but not limited to an integer, a real number, a character, a string, a symbol, a data structure (e.g., an array or a vector), or any combination thereof. If the SOP_data 522 includes a numerical value, the numerical value can have any radix, such as 2, 8, 10, 12, 16, 20, 60, or any number with any precision. The values of the SOP_data 522 can be extended. In addition, a length (e.g., the number of bits) of the SOP_data 522 can be variable as well. For example, the length of the SOP_data 522 can be different for different NALUs in the same video bitstream 500.

Some examples of performing the SOP for different SOP types are described as follows. For each of the SOP types, different SOP techniques can be used. For each of the SOP techniques, different SOP data can be used.

If the SOP_type 518 is indicative of the rotation operation, the rotation_technique can be received from the video bitstream 500. Depending on the value of the rotation_technique, the decoder can determine which rotation technique to be used to perform the rotation operation. The SOP_data 522 can be rotation data that includes aspects or characteristics of a rotation (e.g., a rotation angle, a rotation axis, and/or a rotation direction).

Different rotation techniques can be applied for different scenarios using different rotation data. For example, for videos with small rotation angles, accuracy around small angles can be set higher and accuracy around large angles can be set lower. For another example, for videos with random rotation angles within a rotation range, accuracy for angles within the rotation range can be set as the same. For another example, a two-dimensional (2D) rotation technique can be used for 2D videos and a three-dimensional (3D) rotation technique can be used for 3D videos (e.g., virtual-reality videos or spherical videos).

To perform the rotation operation, some implementations of possible rotation techniques using corresponding rotation data are described as follows, including 2D rotation techniques and 3D rotation techniques.

In an implementation of a first rotation technique, a rotation unit indicative of a minimal rotation angle (or a step for the rotation) can be received by the decoder. The rotation unit can be used to quantize a rotation within a rotation range. For example, the rotation unit can be 1° or 5°, and the rotation data can be indicative of multiples of the rotation unit. The rotation data can be positive or negative numbers, with the signs of the numbers indicative of a rotation direction. For example, if the rotation unit is 5° and the rotation data received is +5, then the rotation operation can correspond to a rotation of 25° counter-clockwise. If the rotation unit is 5° and the rotation data received is −4, then the rotation operation can correspond to a rotation of 20° clockwise. For another example, a negative sign of the rotation data can be indicative of a counter-clockwise rotation, and a positive sign of the rotation data can be indicative of a clockwise rotation. The rotation data can also include positive or negative values only. For example, if the rotation unit is 5°, the rotation data can include a number ranging from 0 to 71, which can represent angles within 360°, either clockwise or counter-clockwise. The precision of the numbers included in the rotation data can also be set differently, according to a supported rotation range and a length (e.g., the number of bits) of the rotation data. For example, if the rotation data has a length of 6 bits and the supported rotation range is [+90°, −90°], then the rotation unit can be set as 2.8° ($180°/2^6 \approx 2.8°$). Alternatively, the precision of the numbers included in the rotation data can also be set according to the defined rotation unit and the supported rotation range.

In an implementation of a second rotation technique, non-uniform rotation units can be received by the decoder. For example, a smaller rotation unit (e.g., 1°) can be used to quantize a small rotation region (e.g., around +/−0°), and a larger rotation unit (e.g., 10°) can be used to quantize a large rotation region (e.g., around +/−90°), or vice versa. For each of the quantized regions, a non-uniform rotation units can be associated. The relationship between the quantized regions and the non-uniform rotation units can be predetermined and used by both the encoder and the decoder. In this implementation, the rotation data can include indices of the quantized regions. The indices can be positive only, negative only, or positive and negative centered on a number (e.g., zero). The signs of the indices can be indicative of a rotation direction.

In an implementation of a third rotation technique, a rotation matrix can be received by the decoder. The rotation matrix can be used to describe rotation angles, rotation directions, or an image rotation technique. For example, the rotation matrix can be determined from the rotation data received and decoded from the video bitstream 500. For example, for a rotation angle θ, the rotation matrix can be $$\begin{bmatrix} \cos\theta & \sin\theta \\ -\sin\theta & \cos\theta \end{bmatrix}.$$

In an example, the rotation matrix can be represented by float point numbers (e.g., single or double precision), or by quantized/scaled integers. In another example, the decoder can receive a rotation angle and apply the rotation matrix using the received rotation angle. By applying the received rotation matrix, the decoder can perform the rotation technique.

In an implementation of a fourth rotation technique, an extended rotation matrix including extra information associated with the rotation can be received by the decoder. The extra information can be data sensed and collected by motion sensors of a video capturing device. For example, if a rotation angle is θ and pixels of a coding unit (e.g., a picture, a slice, a tile, a macroblock, or a block) is shifted by ($x_0$, $y_0$), the extended rotation matrix can be $$\begin{bmatrix} \cos\theta & \sin\theta & x_0 \\ -\sin\theta & \cos\theta & y_0 \end{bmatrix},$$

which can be used to describe the rotation and the shift. An advantage of using matrices is that they can be transformed to describe a forward operation (e.g., rotation and/or shift from a first state to a second state) or an inverse operation (e.g., rotation and/or shift from the second state to the first state). The matrices indicative of the inverse operation can be obtained by negating operations (e.g., negating the rotation angle θ and the shift directions).

In an implementation of a fifth rotation technique, a dictionary for a set of predetermined rotation matrices can be received by the decoder. The set of predetermined rotation matrices can be chosen, such that a rotation matrix of any actual rotation can be decomposed into combinations of a subset of the predetermined rotation matrices. The set of the predetermined rotation matrices can be indexed. In this implementation, the rotation data can include a series of indices, each of the indices corresponding to a predetermined rotation matrix. The decoder can use the received indices and the dictionary to look up the predetermined rotation matrices to use, and determine the rotation operation by applying the looked up predetermined rotation matrices. In this implementation, the encoder and the decoder uses the same dictionary.

In an implementation of a sixth rotation technique, Euclidian coordinates or polar coordinates can be received for the rotation data. In some cases, polar coordinates can be used to reduce complexity of computation for the rotation operations.

In some implementations, the above described rotation techniques can be used to perform 2D rotation operations for a 2D video bitstream. In some implementations, in addition, 3D rotation operations can be performed for a 3D video bitstream. Typically, there are three techniques to describe a 3D rotation: a 3D rotation matrix, Euler angles, and a unit quaternion. In an implementation of a seventh rotation technique, a 3D rotation matrix can be received by the decoder for a 3D video bitstream. Similar to the 2D rotation matrix, the 3D rotation matrix can describe a point in a 3D space shifting for any distance in any direction and rotating with any angle around any axis. Further, the 3D rotation matrix can be transformed with ease to describe a forward operation and an inverse operation as well.

In an implementation of a seventh rotation technique, the Euler angles can be received by the decoder. The Euler angles can decompose a rotation angle θ into three elemental rotations in a Euler coordinate system. In the Euler coordinate system, different sequences of the three elemental rotations can cause different rotations. There are twelve possible sequences of rotation exes in the Euler coordinate system, divided into two groups: Proper Euler angles and Tait-Bryan angles. Gyroscopes typically uses yaw-pitch-roll angles to represent its sensed data indicative of angular velocity information measured along the x-, y- and z-axis. The yaw-pitch-roll angle is one of the Tait-Bryan angles. An advantage of using the Euler angles is that, gyroscopes are widely used in mobile devices with video capturing functions, and the sensed data of the gyroscopes can be minimally processed to generate the rotation data to be encoded and decoded. However, the Euler angles can have a problem of gimbal lock in some cases.

In an implementation of an eighth rotation technique, the unit quaternions can be received by the decoder. An advantage of the unit quaternion is that it can be simpler to compose, and it can avoid the problem of gimbal lock. In addition, the unit quaternion is also more numerically stable and efficient than 3D rotation matrices.

If the SOP_type 518 is indicative of the zoom operation, the zoom_technique can be received from the video bitstream 500. Depending on the value of the zoom_technique, the decoder can determine which zoom technique to be used to perform the zoom operation (e.g., zoom-in or zoom-out). The SOP_data 522 can be the zoom data that includes aspects or characteristics of a zoom (e.g., a center of the zoom and/or a scale of the zoom).

Different zoom techniques can be applied for different scenarios using different zoom data. To perform the zoom operation, some implementations of possible zoom techniques using corresponding zoom data are described as follows.

In an implementation of a first zoom technique, a zoom scale can be received by the decoder. In an example, if a center of a current coding unit (referred to as a "zoom center") is the same as a zoom center of its reference coding unit, the zoom data can include the zoom scale only. For example, the zoom scale with values larger than 1 can be indicative of zoom-in operations, and the zoom scale with values smaller than 1 can be indicative of zoom-out operations.

In an implementation of a second zoom technique, a zoom scale and coordinates associated with the zoom operation can be received by the decoder. In an example, if a center of a current coding unit is not the same as a center of its reference coding unit, in addition to the zoom scale, the zoom data can include coordinates of the zoom centers of the current coding unit and the reference coding unit for calibration. In another example, the coordinates can describe a zoom region that needs to be zoomed, and the coordinates can represent corners and boundaries of the zoom region. In this implementation, with the zoom scale and the coordinates, for zoom-in operations, the zoom region of the coding unit can be shifted and zoomed in to a target region. Similarly, for zoom-out operations, the zoom region of the coding unit can be shifted and patched with new coding units to be zoomed out to a target region.

In an implementation of a third zoom technique, a transformation matrix can be received by the decoder. The received zoom data can include the encoded transformation matrix. For example, if a first axis of a zoom region is resized by $S_x$ times, and a second axis of the zoom region is resized by $S_y$ times, in which the first axis is perpendicular to the second axis, the transformation matrix can be represented as $$\begin{bmatrix} S_x & 0 \\ 0 & S_y \end{bmatrix}.$$

For another example, in addition to the zooming, if the zoom region is also shifted by $(x_0, y_0)$, the transformation matrix can be extended as $$\begin{bmatrix} S_x & 0 & x_0 \\ 0 & S_y & y_0 \end{bmatrix}.$$

By applying the transformation matrix, the decoder can perform the zoom operation.

If the SOP_type 518 is indicative of other types of specific operations, the decoder can receive other SOP technique parameters indicative of which SOP technique to perform the specific operation for the current video data. For example, the other types of specific operations can be a combination of a rotation operation and a zoom operation as described above. If the SOP_type 518 is indicative of a null operation, the decoder will not receive the other SOP technique parameters and no specific operation will be performed for the current picture data.

The following pseudo codes are an example of applying SOP for decoding the video bitstream 500 and are for illustration purpose only. This can be implemented in a parameter set (e.g., VPS, SPS, or PPS) or a header (e.g., a tile header, a slice header, or a picture header) in the video bitstream 500 for an encoded video sequence.

The logic and semantics of syntaxes of using the SOP for decoding a video bitstream (e.g., the video bitstream 500) can be described the following example pseudo codes. Implementations according to this disclosure are not limited to the example pseudo codes. For example, the SOP can use other syntaxes or any combination of syntaxes.

```
{
    ...
    SOP_status;
    ...
}
// after receiving SOP_status
{
    if (SOP_status)
    {
        SOP_type;
```

```
if (SOP_type)
{
    switch SOP_type
    case: rotation
    {
        rotation_technique;
        switch rotation_technique
        case: 0
            rotation_data_0 ...
        case: 1
            rotation_data_1 ...
        ...
    }
    case: zoom
    {
        zoom_technique;
        switch zoom_technique
        case: 10
            zoom_data_10 ...
        case: 11
            zoom_data_11 ...
        ...
    }
    ...
}
...
```

Figure 6:
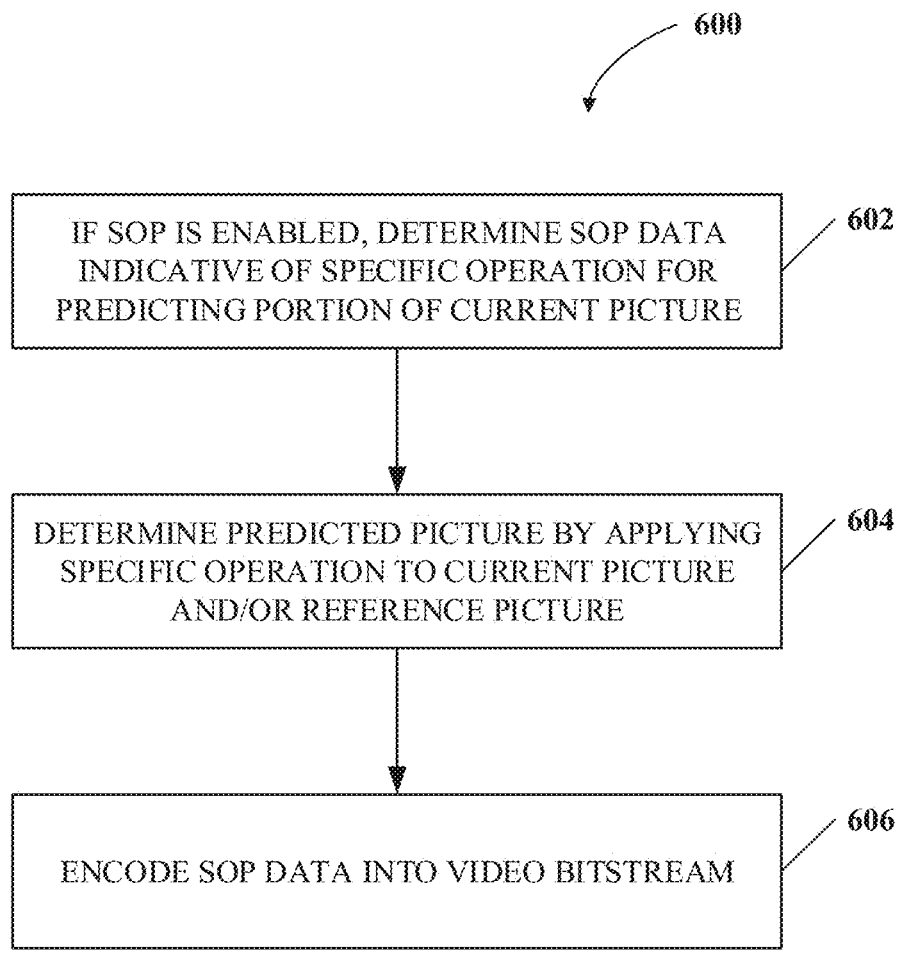
FIG. 6 is a flowchart of an example SOP encoding process according to some implementations of this disclosure.

FIG. 6 is a flowchart of an example SOP encoding process 600 for encoding a video sequence according to some implementations of this disclosure. The video sequence can include a series of consecutive video pictures. The process 600 can be implemented as software and/or hardware modules in the system 100 in FIG. 1. For example, the process 600 can be implemented as modules included in the system 100 by an encoder (e.g., the apparatus 104). The operations of the process 600 can be implemented by operations 204 and 208 in the process 200 in FIG. 2. The process 600 includes data and operations 602-606 to produce an output video bitstream from a video sequence, which are set forth as follows.

At operation 602, if specific-operation prediction (SOP) is enabled for the video sequence, SOP data indicative of a specific operation of an SOP type (e.g., the specific operation data in FIG. 2) is determined by a processor (e.g., the processor 116 in FIG. 1) for a portion of a current picture of the video sequence (e.g., the video sequence 202 in FIG. 2). The specific operation can include rotation, zoom, or other types of specific operations (e.g., a combination of the rotation and the zoom). Correspondingly, the SOP data can include rotation data, zoom data, or other SOP data, and the SOP type can include a rotation type, a zoom type, or another SOP type. In some implementations, the SOP data can be received from sensors of a video capturing device that captures the video sequence. In some other implementations, the SOP data can be determined by detecting rotation between pictures of the video sequence using a technique (e.g., a rotation recognition algorithm).

If the SOP data includes the rotation data, the rotation data can include 2D rotation data or 3D rotation data. In some implementations, as described in the example pseudo code, the 2D rotation data can include at least one of: a minimal angle (e.g., the rotation unit), a count of the minimal angle (e.g., the multiples of the rotation unit), a rotation direction (e.g., signs of the multiples of the rotation unit), an index associated with an angle range, a 2D rotation matrix associated with an angle, a matrix comprising the 2D rotation matrix (e.g., the extended 2D rotation matrix with shift information), an index associated with a predetermined rotation matrix of predetermined rotation matrices (e.g., predetermined indices of the dictionary), a polar coordinate, and a Euclidean coordinate.

In some implementations, as described in the example pseudo code, the 2D rotation data can include at least one of: a 3D rotation matrix associated with an angle, a matrix comprising the 3D rotation matrix (e.g., the extended 3D rotation matrix with shift information), a Euler angle, and a unit quaternion.

If the SOP data includes the zoom data, the zoom data can include at least one of: a zooming scale, a center point associated with the zooming operation (e.g., the zoom center), a first coordinate associated with a corner of a region (e.g., the coordinates indicative of a corner of the zoom region), a second coordinate associated with an edge of the region (e.g., the coordinates indicative of a boundary of the zoom region), a transformation matrix associated with zooming scales, and a matrix comprising the transformation matrix (e.g., the extended transformation matrix with shift information).

At operation 604, a predicted picture for the current picture is determined by applying the specific operation to the portion of the current picture and/or a reference picture for the current picture. For example, the operation 604 can be performed at the operation 204 in FIG. 2. In some implementations, the specific operation can be applied to the reference picture. In some other implementations, the specific operation can be applied to the portion of the current picture.

When the specific operation includes the rotation, a rotation operation can be applied using rotation data. When the specific operation includes the zoom, a zooming operation can be applied using zoom data. The rotation data and the zoom data can be syntax data associated with the portion of the current picture decoded from the video bitstream.

In some implementations, optionally, a future reference picture can be determined using the predicted picture with the specific operation applied, and the future reference picture can be further used for predicting a future picture. For example, a reference picture encoded using SOP can be outputted as the future reference picture that can be further used for predicting a future picture without applying the SOP.

At operation 606, the SOP data is encoded into the video bitstream for the portion of the current picture. For example, the operation 606 can be performed at the operation 208 in FIG. 2, in which the SOP data is entropy encoded into the video bitstream. In addition to the SOP data, other data can also be encoded into the video bitstream. For example, a prediction status parameter indicative of whether the SOP is enabled and an SOP type parameter indicative of the SOP type can also be encoded into the video bitstream. In some implementations, the SOP data, the prediction status parameter, and the SOP type parameter can be encoded as syntax data with variable number of bits.

Figure 7:
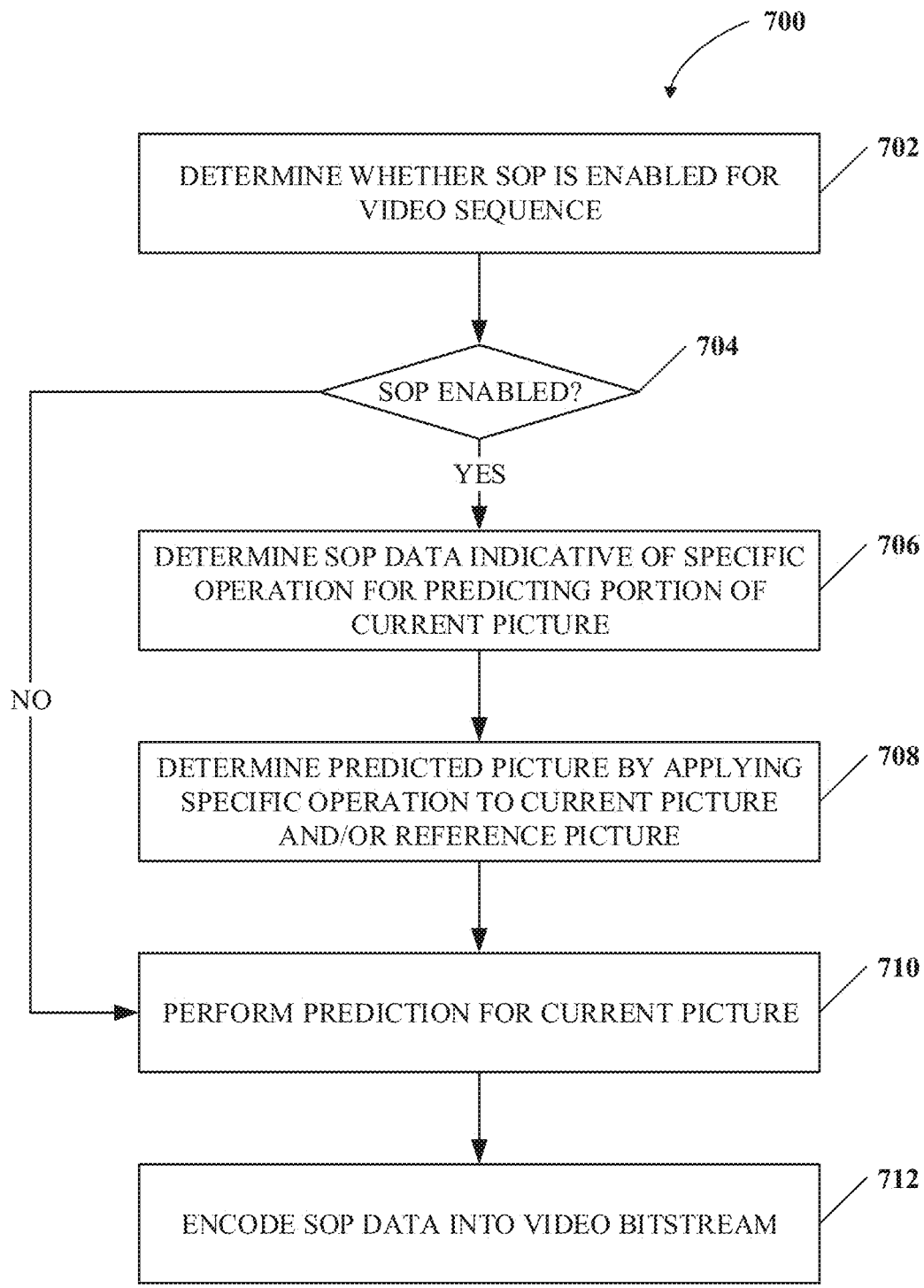
FIG. 7 is a flowchart of another example SOP encoding process according to some implementations of this disclosure.

FIG. 7 is a flowchart of an example encoding process 700 for encoding a video sequence according to some implementations of this disclosure. The process 700 can be implemented as software and/or hardware modules in the system 100 in FIG. 1. For example, the process 700 can be implemented as modules included in the system 100 by an encoder (e.g., the apparatus 104). The operations of the process 700 can be implemented by operations 204 and 208 in the process 200 in FIG. 2. The process 700 includes data and operations 702-712 to produce an output video bitstream from a video sequence, which are set forth as follows.

At operation 702, it is determined by a processor (e.g., the processor 116 in FIG. 1) whether SOP is enabled for the video sequence. For example, the encoder can receive an external parameter to indicate whether the SOP is enabled. The external parameter can be a configuration item that can be changed in an interface of the encoder, or a configuration parameter that can be passed to the encoder.

At operation 704, it is determined whether the SOP is enabled based on the value of the prediction status parameter. If the SOP is enabled, the process 700 proceeds to operation 706. Otherwise, the process 700 proceeds to operation 710.

At operation 706, SOP data indicative of a specific operation of an SOP type (e.g., the specific operation data in the process 200) is determined for a portion of a current picture of the video sequence (e.g., the video sequence 202 in FIG. 2). The operation 706 can be similar to the operation 602.

At operation 708, a predicted picture for the current picture is determined by applying the specific operation to the portion of the current picture and/or a reference picture for the current picture. The operation 706 can be similar to the operation 604.

At operation 710, inter- and/or intra-prediction is performed for the current picture using the predicted picture. The specific operation is applied to generate the predicted picture prior to performing the inter- and/or intra-prediction for the current picture. For example, the operation 710 can be performed as the operation 204 in FIG. 2, and output the residual data and the motion data. In an implementation, the SOP is performed at a picture level (e.g., the current picture and/or the reference picture of the current picture is rotated or zoomed) prior to block-level inter- and/or intra-prediction.

At operation 712, the SOP data is encoded into the video bitstream for the portion of the current picture. The operation 712 can be similar to the operation 602. In an implementation, data resulted from the inter-prediction or the intra-prediction for the current picture (e.g., the residual data and the motion data in FIG. 2), a prediction status parameter indicative of whether the SOP is enabled, an SOP type parameter indicative of the SOP type, and the SOP data can be encoded into a portion of a video bitstream as syntax data with variable number of bits. For example, the specific operation data in FIG. 2 can be encoded into the video bitstream, which can include the prediction status parameter, the SOP type parameter, and the SOP data.

In an implementation, for example, the SOP data can be encoded and stored as the SOP_data 522 in the header 512 included in the VCL NALU 506 of the video bitstream 500 in FIG. 5. For another example, the SOP data can also be encoded and stored in the parameter set 510 (e.g., PPS, SPS, VPS, or any other parameter set) included in the non-VCL NALU 502 of the video bitstream 500.

In another implementation, for example, a parameter (e.g., the SOP_technique) indicative of a SOP technique can also be encoded into the video bitstream. For example, the SOP technique parameter can be encoded and stored as the SOP_technique 520 in the header 512 included in the VCL NALU 506 of the video bitstream 500 in FIG. 5. For another example, the SOP technique parameter can also be encoded and stored in the parameter set 510 (e.g., PPS, SPS, VPS, or any other parameter set) included in the non-VCL NALU 502 of the video bitstream 500.

In another implementation, for example, the SOP type parameter can be encoded and stored as the SOP_type 518 in the header 512 included in the VCL NALU 506 of the video bitstream 500 in FIG. 5. For another example, the SOP data can also be encoded and stored in the parameter set 510 (e.g., PPS, SPS, VPS, or any other parameter set) included in the non-VCL NALU 502 of the video bitstream 500.

In another implementation, the prediction status parameter can be encoded into a parameter set (e.g., the parameter set 510 in FIG. 5) associated with the video bitstream. The parameter set can be PPS, SPS, VPS, or any other parameter set. For example, the prediction status parameter can be encoded and stored as the SOP_status 516 in the parameter set 510 included in the non-VCL NALU 502 of the video bitstream 500 in FIG. 5.

Figure 8:
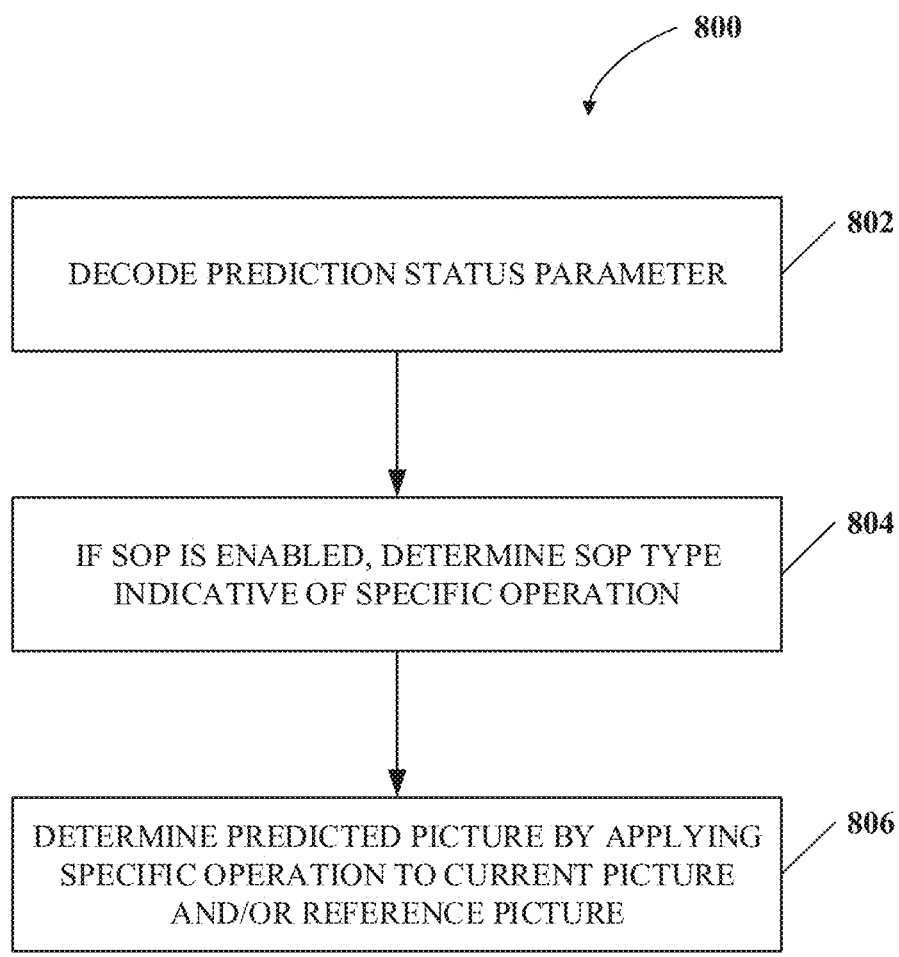
FIG. 8 is a flowchart of an example SOP decoding process according to some implementations of this disclosure.

FIG. 8 is a flowchart of an example SOP decoding process 800 for decoding a video bitstream according to some implementations of this disclosure. The process 800 can be implemented as software and/or hardware modules in the system 100 in FIG. 1. For example, the process 800 can be implemented as modules included in the system 100 by a decoder (e.g., the apparatus 102). The operations of the process 800 can be implemented by operations 304 and 308 in the process 300 in FIG. 3. The process 800 includes data and operations 802-806 to produce an output video sequence from a compressed video bitstream, which are set forth as follows.

At operation 802, a prediction status parameter indicative of whether SOP is enabled is decoded from the video bitstream. For example, the video bitstream can be entropy decoded in the operation 304 in FIG. 3 to obtain specific operation data, and the prediction status parameter can be obtained from the specific operation data. For example, the prediction status parameter can be the SOP_status parameter in the example pseudo codes. In an implementation, the prediction status parameter can be encoded in the received video bitstream and can be decoded by a processor (e.g., the processor 108 in FIG. 1).

In an implementation, the prediction status parameter can be determined from a parameter set associated with the video bitstream (e.g., the parameter set 510 in FIG. 5). The parameter set can be PPS, SPS, VPS, or any other parameter set. For example, the prediction status parameter can be received and determined as the SOP_status 516 in FIG. 5.

At operation 804, if the SOP is determined as enabled, a SOP type indicative of a specific operation is determined for predicting a portion of a current picture of the video bitstream. In an implementation, the SOP type can be indicated by a parameter (e.g., the SOP_type parameter in the example pseudo codes) received from the video bitstream. For example, the SOP type parameter can be received and determined as the SOP_type 518 in FIG. 5. In another implementation, the specific operation can be described by SOP data (e.g., the rotation data and the zoom data as described in the example pseudo codes) also received from the video bitstream. For example, the SOP data can be received and determined as the SOP_data 522 in FIG. 5. The SOP data can be associated with a specific operation technique, which can also be indicated by a parameter (e.g., the SOP_technique) received from the video bitstream. For example, the SOP technique parameter can be received and determined as the SOP_technique 520 in FIG. 5.

In an implementation, the SOP type can be determined from the parameter set and/or header data associated with the portion of the current picture. For example, the portion of the current picture can be the current picture, a slice of the current picture, a tile of the current picture, a macroblock of the current picture, or a block of the current picture. Correspondingly, the header data can be a picture header, a slice header, or a tile header.

If the SOP data includes the rotation data, the rotation data can include data associated with a two-dimensional (2D) rotation operation (referred to as "2D rotation data") and/or data associated with a three-dimensional (3D) rotation operation (referred to as "3D rotation data").

In some implementations, as described in the example pseudo code, the 2D rotation data can include at least one of: a minimal angle (e.g., the rotation unit), a count of the minimal angle (e.g., the multiples of the rotation unit), a rotation direction (e.g., signs of the multiples of the rotation unit), an index associated with an angle range, a 2D rotation matrix associated with an angle, a matrix comprising the 2D rotation matrix (e.g., the extended 2D rotation matrix with shift information), an index associated with a predetermined rotation matrix of predetermined rotation matrices (e.g., predetermined indices of the dictionary), a polar coordinate, and a Euclidean coordinate.

In some implementations, as described in the example pseudo code, the 3D rotation data can include at least one of: a 3D rotation matrix associated with an angle, a matrix comprising the 3D rotation matrix (e.g., the extended 3D rotation matrix with shift information), a Euler angle, and a unit quaternion.

If the SOP data includes the zoom data, the zoom data can include at least one of: a zooming scale, a center point associated with the zooming operation (e.g., the zoom center), a first coordinate associated with a corner of a region (e.g., the coordinates indicative of a corner of the zoom region), a second coordinate associated with an edge of the region (e.g., the coordinates indicative of a boundary of the zoom region), a transformation matrix associated with zooming scales, and a matrix comprising the transformation matrix (e.g., the extended transformation matrix with shift information).

At operation 806, a predicted picture for the current picture is determined by applying the specific operation to the portion of the current picture and/or a reference picture for the current picture. For example, the operation 806 can be similar to the operation 308 in FIG. 3. The specific operation can include rotation, zoom, or other types of specific operations. In some implementations, the specific operation can be applied to the reference picture. In some other implementations, the specific operation can be applied to the portion of the current picture.

When the specific operation includes the rotation, a rotation operation can be applied using rotation data. When the specific operation includes the zoom, a zooming operation can be applied using zoom data. The rotation data and the zoom data can be syntax data associated with the portion of the current picture decoded from the video bitstream.

In some implementations, optionally, a future reference picture can be determined using the predicted picture with the specific operation applied, and the future reference picture can be further used for predicting a future picture without applying the SOP. In another implementation, a SOP-encoded reference picture can be received as the future reference picture that can be further used for predicting a future picture without applying the SOP.

Figure 9:
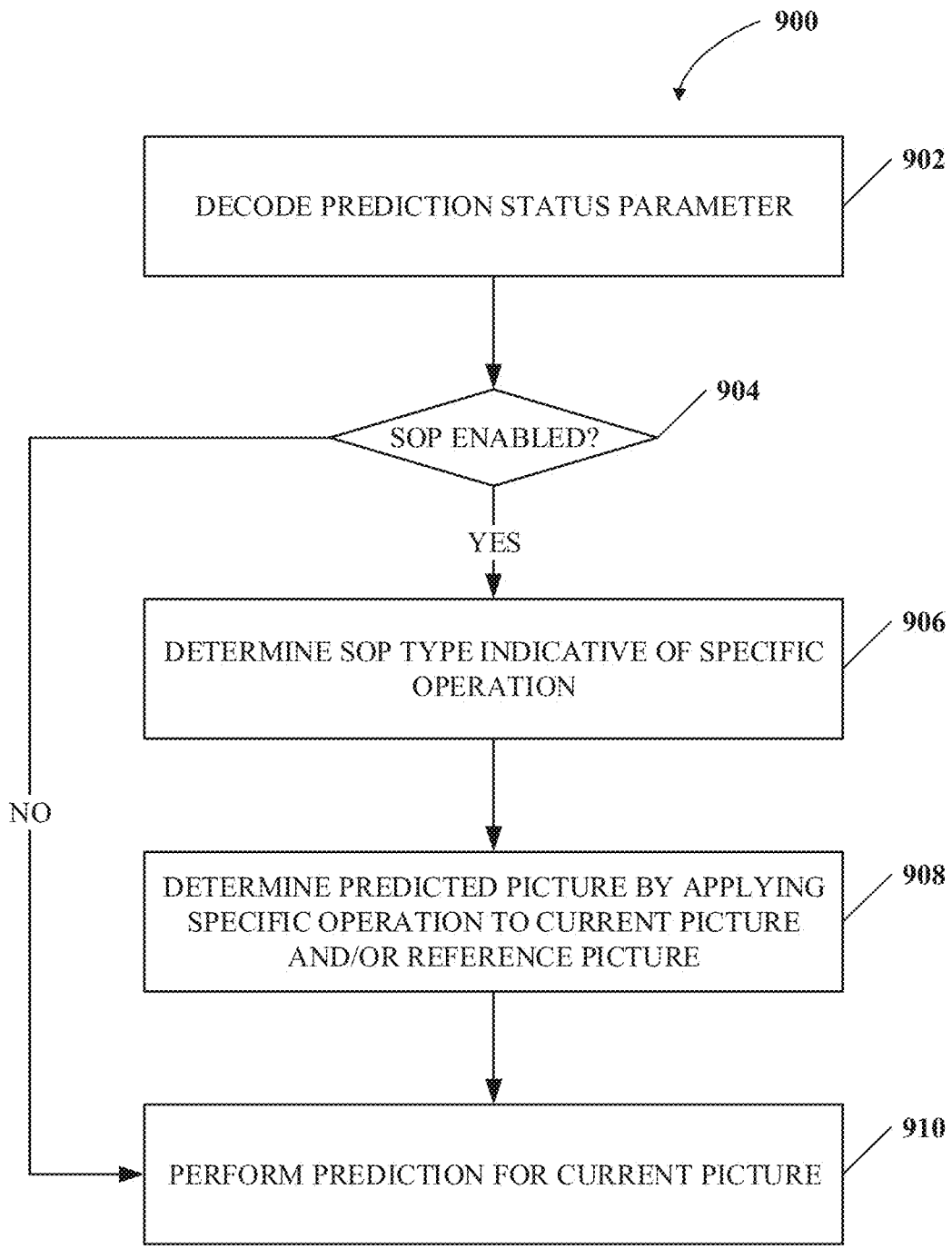
FIG. 9 is a flowchart of another example SOP decoding process according to some implementations of this disclosure.

FIG. 9 is a flowchart of an example SOP decoding process 900 for decoding a video bitstream according to some implementations of this disclosure. The process 900 can be implemented as software and/or hardware modules in the system 100 in FIG. 1. For example, the process 900 can be implemented as modules included in the system 100 by a decoder (e.g., the apparatus 102). The operations of the process 900 can be implemented by operations 304 and 308 in the process 300 in FIG. 3. The process 900 includes data and operations 902-910 to produce an output video sequence from a compressed video bitstream, which are set forth as follows.

At operation 902, a prediction status parameter indicative of whether SOP is enabled is decoded from the video bitstream. The operation 902 can be similar to the operation 802 in the process 800.

At operation 904, it is determined whether the SOP is enabled based on the value of the prediction status parameter. If the SOP is enabled, the process 900 proceeds to operation 906. Otherwise, the process 900 proceeds to operation 910.

At operation 906, a SOP type indicative of a specific operation is determined for predicting a portion of a current picture of the video bitstream. The operation 906 can be similar to the operation 804.

At operation 908, a predicted picture for the current picture is determined by applying the specific operation to the portion of the current picture and/or a reference picture for the current picture. The operation 906 can be similar to the operation 806.

At operation 910, inter- and/or intra-prediction is performed for the current picture using the predicted picture. The specific operation is applied to generate the predicted picture prior to performing the inter- and/or intra-prediction for the current picture. For example, the operation 910 can be performed at the operation 304 in FIG. 3, using the residual data, the motion data, and the reference data with SOP applied. In an implementation, the SOP is performed at a picture level (e.g., the current picture and/or the reference picture of the current picture is rotated or zoomed) prior to block-level inter- and/or intra-prediction.

According to implementations of this disclosure, an apparatus for decoding a video bitstream can be implemented. The apparatus can include software and/or hardware modules. For example, the apparatus can be a decoder (e.g., the apparatus 102) in a video compression and transmission system (e.g. the system 100 in FIG. 1). The apparatus can produce an output video sequence from a compressed video bitstream. The operations of the apparatus can include stages in the process 300 in FIG. 3.

The apparatus includes a processor (e.g., the processor 108 in FIG. 1) and a memory (e.g., the memory 110 in FIG. 1). Optionally, the apparatus can further include an I/O device (e.g., the I/O device 112 in FIG. 1) and a communication device (e.g., the communication device 114 in FIG. 1). The memory is coupled to the processor and configured to store a set of instructions which become operational with the processor when executed by the processor. For example, the apparatus can perform operations of the process 800 or the process 900 by the processor.

The instructions can be executed by the process to: determine, from the video bitstream, a prediction status parameter indicative of whether SOP is enabled for the video bitstream; if the SOP is enabled, determine, for a portion of a current picture of the video bitstream, a SOP type indicative of a specific operation for predicting the portion of the current picture; and determine a predicted picture for the current picture by applying the specific operation to at least one of the portion of the current picture and a reference picture for the current picture prior to performing inter-prediction or intra-prediction for the current picture, in which the specific operation is at least one of rotation and zoom.

According to implementations of this disclosure, an apparatus for encoding a video bitstream can be implemented. The apparatus can include software and/or hardware modules. The apparatus can be used as an encoder (e.g., the apparatus 104) in a video compression and transmission system (e.g. the system 100 in FIG. 1). The apparatus can produce an output video bitstream from a video sequence. The operations of the apparatus can include stages in the process 200 in FIG. 2.

The apparatus includes a processor (e.g., the processor 116 in FIG. 1) and a memory (e.g., the memory 118 in FIG. 1). Optionally, the apparatus can further include an I/O device (e.g., the I/O device 120 in FIG. 1) and a communication device (e.g., the communication device 122 in FIG. 1). The memory is coupled to the processor and configured to store a set of instructions which become operational with the processor when executed by the processor. For example, the apparatus can perform operations of the process 600 or the process 700 by the processor.

The instructions can be executed by the process to: determine, by a processor, whether SOP is enabled for the video sequence; if the SOP is enabled, receive, for a portion of a current picture of the video sequence, SOP data indicative of a specific operation of an SOP type, in which the specific operation is at least one of rotation and zoom; and determine a predicted picture for the current picture by applying the specific operation to at least one of the portion of the current picture and a reference picture for the current picture.

As described above, a person skilled in the art should be noted that, all or a portion of aspects of the disclosure described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing, either singly or in combination. The terms "signal" and "data" are used interchangeably. Further, portions of the computing devices do not necessarily have to be implemented in the same manner.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's can contain other general or special purpose blocks as well. An example FPGA can be programmed based on a hardware definition language (HDL) design, such as VHSIC Hardware Description Language or Verilog.

The aspects herein can be described in terms of functional block components and various processing operations. The disclosed processes and sequences may be performed alone or in any combination. Functional blocks can be realized by any number of hardware and/or software components that perform the specified functions. For example, the described aspects can employ various integrated circuit components, e.g., memory elements, processing elements, logic elements, look-up tables, and the like, which can carry out a variety of functions under the control of one or more microprocessors or other control devices. Similarly, where the elements of the described aspects are implemented using software programming or software elements the disclosure can be implemented with any programming or scripting language such as C, C++, Java, assembler, or the like, with the various algorithms being implemented with any combination of data structures, objects, processes, routines or other programming elements. Functional aspects can be implemented in algorithms that execute on one or more processors. Furthermore, the aspects of the disclosure could employ any number of conventional techniques for electronics configuration, signal processing and/or control, data processing and the like. The words "mechanism" and "element" are used broadly and are not limited to mechanical or physical implementations or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

Any of the individual or combined functions described herein as being performed as examples of the disclosure can be implemented using machine readable instructions in the form of code for operation of any or any combination of the aforementioned hardware. Computational code can be implemented in the form of one or more modules by which individual or combined functions can be performed as a computational tool, the input and output data of each module being passed to/from one or more further module during operation of the methods and systems described herein.

Information, data, and signals can be represented using a variety of different technologies and techniques. For example, any data, instructions, commands, information, signals, bits, symbols, and chips referenced herein can be represented by voltages, currents, electromagnetic waves, magnetic fields or particles, optical fields or particles, other items, or a combination of the foregoing.

The particular aspects shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an aspect" or "one aspect" throughout is not intended to mean the same implementation or aspect unless described as such.

The use of "including" or "having" and variations thereof herein is meant to encompass the items listed thereafter and equivalents thereof as well as additional items. Unless specified or limited otherwise, the terms "mounted," "connected," 'supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the disclosure (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of examples, or exemplary language (e.g., "such as") provided herein, is intended merely to better illuminate the disclosure and does not pose a limitation on the scope of the disclosure unless otherwise claimed.

This specification has been set forth with various headings and subheadings. These are included to enhance readability and ease the process of finding and referencing material in the specification. These heading and subheadings are not intended, and should not be used, to affect the interpretation of the claims or limit claim scope in any way. The particular implementations shown and described herein are illustrative examples of the disclosure and are not intended to otherwise limit the scope of the disclosure in any way.

All references, including publications, patent applications, and patents, cited herein are hereby incorporated by reference to the same extent as if each reference were individually and specifically indicated as incorporated by reference and were set forth in its entirety herein.

While the disclosure has been described in connection with certain embodiments and implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for decoding a video bitstream, comprising:
    decoding, from the video bitstream by a processor, a prediction status parameter indicative of whether specific-operation prediction (SOP) is enabled for the video bitstream;
    based on a determination that the SOP is enabled, determining, based on a SOP type parameter, a specific operation for predicting a portion of a current picture, wherein the specific operation is at least one of rotation, zoom, or another specific operation; and
    determining a predicted picture for the current picture by applying the specific operation to at least one of a reference picture for the current picture or the current picture, wherein the determining the predicted picture for the current picture comprising:
        decoding, from the video bitstream by the processor, rotation data comprising:
            a rotation unit, wherein the rotation unit quantizes a rotation within a rotation range according to a non-uniform quantization,
            wherein the non-uniform quantization is such that a first rotation within a first rotation range quantizes to a first rotation unit and a second rotation within a second rotation range quantizes to a second rotation unit, the first rotation unit being different from the second rotation unit when the first rotation range is different from the second rotation range; and
            a multiplier of the rotation unit; and
        applying a rotation operation to the at least one of the reference picture for the current picture or the current picture using the rotation data when the determined specific operation comprises rotation.

2. The method of claim 1, wherein the portion of the current picture comprises one of: the current picture, a tile of the current picture, or a slice of the current picture.

3. The method of claim 1, wherein determining the predicted picture for the current picture comprises:
    applying the specific operation to the at least one of the reference picture for the current picture or the current picture prior to performing prediction for the current picture.

4. The method of claim 1, wherein determining the predicted picture for the current picture comprises:
    determining the predicted picture for the current picture by applying the specific operation to the reference picture for the current picture.

5. The method of claim 1, wherein the prediction status parameter is determined from a parameter set associated with the video bitstream, and the SOP type parameter is determined from at least one of the parameter set or header data associated with the portion of the current picture, and wherein the parameter set comprises at least one of a picture parameter set (PPS), a sequence parameter set (SPS), or a video parameter set (VPS).

6. The method of claim 1, wherein determining the predicted picture for the current picture by applying the specific operation to the at least one of the reference picture for the current picture or the current picture further comprises:

applying a zooming operation to the at least one of the reference picture for the current picture or the current picture using zoom data when the determined specific operation comprises zoom, wherein the rotation data and the zoom data are associated with the portion of the current picture and decoded from the video bitstream.

7. The method of claim 6, wherein the rotation data further comprises at least one of:

data associated with a two-dimensional (2D) rotation operation comprising at least one of: a minimal angle, a count of the minimal angle, a rotation direction, a first index associated with an angle range, a 2D rotation matrix associated with an angle, a matrix comprising the 2D rotation matrix, a second index associated with a predetermined rotation matrix of predetermined rotation matrices, a polar coordinate, or a Euclidean coordinate; or data associated with a three-dimensional (3D) rotation operation comprising at least one of: a 3D rotation matrix associated with an angle in 3D space, a matrix comprising the 3D rotation matrix, a Euler angle, or a unit quaternion.

8. The method of claim 6, wherein the zoom data comprises at least one of: a zooming scale, a center point associated with the zooming operation, a first coordinate associated with a corner of a region, a second coordinate associated with an edge of the region, a transformation matrix associated with zooming scales, or a matrix comprising the transformation matrix.

9. A method for encoding a video sequence, comprising:

based on a determination that specific-operation prediction (SOP) is enabled for the video sequence, determining, by a processor, SOP data indicative of a specific operation for predicting a portion of a current picture of the video sequence;

determining a predicted picture for the current picture by applying the specific operation to at least one of a reference picture for the current picture or the current picture, wherein the specific operation comprises at least one of rotation or zoom; and encoding, for the portion of the current picture, the SOP data and a SOP type parameter, encoding the SOP data and the SOP type parameter comprising:

encoding, for a rotation operation, rotation data comprising:

a rotation unit, wherein the rotation unit quantizes a rotation within a rotation range according to a non-uniform quantization, wherein the non-uniform quantization is such that a first rotation within a first rotation range quantizes to a first rotation unit and a second rotation within a second rotation range quantizes to a second rotation unit, the first rotation unit being different from the second rotation unit when the first rotation range is different from the second rotation range; and a multiplier of the rotation unit.

10. The method of claim 9, wherein determining the predicted picture for the current picture comprises:

determining the predicted picture for the current picture by applying the specific operation to the reference picture for the current picture.

11. The method of claim 9, wherein determining the predicted picture for the current picture comprises:

applying the specific operation to the at least one of the reference picture for the current picture or the current picture prior to performing prediction for the current picture.

12. The method of claim 9, further comprising:

encoding a prediction status parameter indicative of whether the SOP is enabled, wherein the prediction status parameter is encoded into a parameter set associated with a video bitstream, wherein the parameter set comprises at least one of a picture parameter set (PPS), a sequence parameter set (SPS), or a video parameter set (VPS), wherein the SOP type parameter and the SOP data are encoded into at least one of the parameter set or header data associated with the portion of the current picture, and wherein the portion of the current picture comprises one of: the current picture, a tile of the current picture, or a slice of the current picture.

13. The method of claim 9, wherein determining the predicted picture for the current picture by applying the specific operation to the at least one of the reference picture for the current picture or the current picture comprises:

when the SOP data comprises the rotation data, applying the rotation operation to the at least one of the reference picture for the current picture or the current picture using the rotation data; and when the SOP data comprises zoom data, applying a zooming operation to the at least one of the reference picture or the current picture for the current picture using the zoom data.

14. The method of claim 13, wherein the rotation data further comprises at least one of:

data associated with a two-dimensional (2D) rotation operation comprising at least one of: a minimal angle, a count of the minimal angle, a rotation direction, a first index associated with an angle range, a 2D rotation matrix associated with an angle, a matrix comprising the 2D rotation matrix, a second index associated with a predetermined rotation matrix of predetermined rotation matrices, a polar coordinate, or a Euclidean coordinate; or data associated with a three-dimensional (3D) rotation operation comprising at least one of: a 3D rotation matrix associated with an angle in 3D space, a matrix comprising the 3D rotation matrix, a Euler angle, or a unit quaternion.

15. The method of claim 13, wherein the zoom data comprises at least one of:

a zooming scale, a center point associated with the zooming operation, a first coordinate associated with a corner of a region, a second coordinate associated with an edge of the region, a transformation matrix associated with zooming scales, or a matrix comprising the transformation matrix.

16. An apparatus for decoding a video bitstream, comprising:

a processor; and a memory coupled to the processor, the memory configured to store instructions which when executed by the processor become operational with the processor to:

determine, from the video bitstream, a prediction parameter indicative of whether specific-operation prediction (SOP) is enabled for the video bitstream;

based on a determination that the SOP is enabled, determine, based on a SOP type parameter, a specific operation for predicting a portion of a current picture; and determine a predicted picture for the current picture by applying the specific operation to at least one of a reference picture for the current picture or the current picture prior to performing prediction for the current picture, wherein a first value of the SOP type parameter corresponds with a first specific operation, wherein a second value of the SOP type parameter corresponds with a second specific operation, and wherein the first specific operation comprises at least one of rotation or zoom, wherein to determine the predicted picture for the current picture comprises to:

determine, from the video bitstream, rotation data comprising:
- a rotation unit, wherein the rotation unit quantizes a rotation within a rotation range according to a non-uniform quantization,
    - wherein the non-uniform quantization is such that a first rotation within a first rotation range quantizes to a first rotation unit and a second rotation within a second rotation range quantizes to a second rotation unit, the first rotation unit being different from the second rotation unit when the first rotation range is different from the second rotation range; and
- a multiplier of the rotation unit; and apply a rotation operation to the at least one of the reference picture for the current picture or the current picture using the rotation data when the specific operation comprises rotation.

17. The apparatus of claim 16, wherein the instructions operational with the processor to determine the predicted picture for the current picture further comprise instructions to:
determine the predicted picture for the current picture by applying the specific operation to the reference picture for the current picture.

18. The apparatus of claim 16, wherein the prediction status parameter is determined from a parameter set associated with the video bitstream, and the SOP type parameter is determined from at least one of the parameter set or header data associated with the portion of the current picture, and wherein the parameter set comprises at least one of a picture parameter set (PPS), a sequence parameter set (SPS), or a video parameter set (VPS), and the portion of the current picture comprises at least one of the current picture, a slice of the current picture, or a tile of the current picture.

19. The apparatus of claim 16, wherein the instructions operational with the processor to determine the predicted picture for the current picture further comprise instructions to:
apply a zooming operation to the at least one of the reference picture for the current picture or the current picture using zoom data when the specific operation comprises zoom,
wherein the rotation data and the zoom data are associated with the portion of the current picture and decoded from the video bitstream.

20. The apparatus of claim 19, wherein the rotation data further comprises at least one of:
data associated with a two-dimensional (2D) rotation operation comprising at least one of: a minimal angle, a count of the minimal angle, a rotation direction, a first index associated with an angle range, a 2D rotation matrix associated with an angle, a matrix comprising the 2D rotation matrix, a second index associated with a predetermined rotation matrix of predetermined rotation matrices, a polar coordinate, or a Euclidean coordinate, or
data associated with a three-dimensional (3D) rotation operation comprising at least one of: a 3D rotation matrix associated with an angle in 3D space, a matrix comprising the 3D rotation matrix, a Euler angle, or a unit quaternion; and
the zoom data comprises at least one of: a zooming scale, a center point associated with the zooming operation, a first coordinate associated with a corner of a region, a second coordinate associated with an edge of the region, a transformation matrix associated with zooming scales, or a matrix comprising the transformation matrix.

* * * * *